(12) United States Patent
Zeng et al.

(10) Patent No.: US 11,870,255 B2
(45) Date of Patent: Jan. 9, 2024

(54) SYSTEM, DEVICE, AND METHOD FOR OFF-GRID MICROGRIDS MANAGEMENT

(71) Applicants: TOTAL SOLAR INTERNATIONAL, Courbevoie (FR); NORTH CAROLINA STATE UNIVERSITY, Raleigh, NC (US)

(72) Inventors: Wente Zeng, Courbevoie (FR); Jiahong Yan, Raleigh, NC (US); Ning Lu, Raleigh, NC (US); Fuhong Xie, Raleigh, NC (US)

(73) Assignees: TOTAL SOLAR INTERNATIONAL, Courbevoie (FR); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 16/980,568

(22) PCT Filed: Mar. 16, 2018

(86) PCT No.: PCT/US2018/022880
§ 371 (c)(1),
(2) Date: Sep. 14, 2020

(87) PCT Pub. No.: WO2019/177621
PCT Pub. Date: Sep. 19, 2019

(65) Prior Publication Data
US 2021/0006069 A1 Jan. 7, 2021

(51) Int. Cl.
*H02J 3/14* (2006.01)
*H02J 3/00* (2006.01)

(52) U.S. Cl.
CPC .............. *H02J 3/003* (2020.01); *H02J 3/14* (2013.01); *H02J 3/144* (2020.01); *H02J 2203/20* (2020.01); *H02J 2310/14* (2020.01)

(58) Field of Classification Search
CPC .... H02J 3/003; H02J 3/14; H02J 3/144; H02J 2203/20; H02J 2310/10; H02J 2310/14;
(Continued)

(56) References Cited

U.S. PATENT DOCUMENTS 10,819,138 B2 * 10/2020 Cho ...................... H02J 7/0068
11,322,950 B2 * 5/2022 Park ......................... H02J 3/32
(Continued)

FOREIGN PATENT DOCUMENTS

JP         6053554 B2 * 12/2016 ................ H02J 7/00
KR         2014201 B1 *  8/2019 ................ H02J 3/32
WO    WO 2014/038966 A1    3/2014

OTHER PUBLICATIONS

JP-6053554-B2 machine translation.*
(Continued)

*Primary Examiner* — M. N. Von Buhr
(74) *Attorney, Agent, or Firm* — Oblon, McClelland, Maier & Neustadt, L.L.P.

(57) ABSTRACT

A method, system, and device for managing off-grid power supply are provided. The method includes acquiring data from one or more loads. The one or more loads are connected to the off-grid power supply. The method further includes modeling the one or more loads based on the acquired data, estimating a state of charge of an energy storage device (ESD) associated with the off-grid power supply, and determining an operational status of each of the one or more loads. The operational status is based on at least the state of charge of the ESD and a category of each of the one or more loads. Each load is controlled based on the operational status.

20 Claims, 19 Drawing Sheets

(58) Field of Classification Search
CPC .... H02J 7/34; H02J 7/35; Y02B 70/30; Y02B 70/3225; Y04S 20/222; Y04S 20/242
See application file for complete search history.

(56) References Cited

U.S. PATENT DOCUMENTS

| | | | | |
|---|---|---|---|---|
| 2009/0045815 | A1* | 2/2009 | Zhang | B60L 1/003 324/426 |
| 2011/0282505 | A1* | 11/2011 | Tomita | H02J 3/14 700/291 |
| 2012/0130556 | A1* | 5/2012 | Marhoefer | G06Q 10/04 700/291 |
| 2013/0285446 | A1* | 10/2013 | Chow | H02J 7/0021 307/18 |
| 2013/0345998 | A1* | 12/2013 | Matsubara | G01R 21/00 702/60 |
| 2014/0142774 | A1 | 5/2014 | Katayama et al. | |
| 2015/0214738 | A1 | 7/2015 | Covic et al. | |
| 2015/0309547 | A1* | 10/2015 | Huang | H02J 7/0068 307/80 |
| 2016/0041574 | A1* | 2/2016 | Maitani | G05F 1/66 700/291 |
| 2016/0091904 | A1* | 3/2016 | Horesh | F24F 11/58 700/276 |
| 2016/0197519 | A1* | 7/2016 | Carter | H02J 3/00 700/291 |
| 2016/0294188 | A1 | 10/2016 | Stiefenhofer | |
| 2017/0005515 | A1* | 1/2017 | Sanders | H02J 3/14 |
| 2017/0050592 | A1* | 2/2017 | Kloess | B60R 16/033 |
| 2017/0288413 | A1* | 10/2017 | Varadarajan | H02J 7/007 |
| 2017/0326999 | A1* | 11/2017 | Tani | H02J 7/0029 |
| 2017/0331325 | A1* | 11/2017 | Ristau | H02J 3/14 |
| 2017/0346283 | A1* | 11/2017 | Inam | H02J 1/14 |
| 2018/0062388 | A1* | 3/2018 | Mathiesen | H02J 3/14 |
| 2018/0143258 | A1* | 5/2018 | Kim | G01R 31/396 |
| 2018/0162352 | A1* | 6/2018 | Lee | B60W 10/08 |
| 2018/0191160 | A1* | 7/2018 | Carr | H02J 3/381 |
| 2018/0321326 | A1* | 11/2018 | Tanaka | H02J 7/0048 |
| 2018/0357577 | A1* | 12/2018 | Elbsat | G06Q 10/04 |
| 2019/0036356 | A1* | 1/2019 | Subbaraman | G01R 31/392 |
| 2019/0107069 | A1* | 4/2019 | Zhao | B60W 10/06 |
| 2020/0235446 | A1* | 7/2020 | Al-Hallaj | H01M 10/486 |

OTHER PUBLICATIONS

KR-2014201-B1 machine translation.*
International Search Report and Written Opinion dated Nov. 16, 2018 in PCT/US2018/022880 filed on Mar. 16, 2018.
Indian Office Action dated Jul. 13, 2022, issued in Indian Patent Application No. 202017039085 (with English translation).

* cited by examiner

Priority Setting

Setup appliances' priority, which Level 5 has the highest priority and Level 1 means the lowest superiority. The default setting estimates all appliances priority as Level 3.

Plug #1: [Level 1]
Plug #2: [Level 2]
Plug #3: [Level 3]
Plug #4: [Level 4]
Plug #5: [Level 5]

5 Most Improtant
3
1 Least Important

[Finish] [Default] [Cancel]

FIG. 6B

Power Limit Setting

Setup the battery output power limit that output power won't larger than Maximum or less than Minimun. the default case sets 0 as power minimum and 800W as power maximum.

Power Maximun: [0] (Unit: Watt)
Power Minimum: [1000] (Unit: Watt)

[Finish] [Default] [Cancel]

FIG. 6C

SYSTEM, DEVICE, AND METHOD FOR OFF-GRID MICROGRIDS MANAGEMENT

BACKGROUND

Power outages often cause severe damage to critical infrastructure and disrupt people's lives. According to Washington Utilities and Transportation Commission (UTC), the top-three outage cause categories are weather, fires, and public-caused. Their respective contributions are 27.6%, 16.6%, and 12.4. Restoring from such events frequently requires temporary housing, which may not be readily powered by the damaged main grid. In particular, people living in remote villages may often need to rely on diesel generators, photovoltaics, or batteries as a main power sources in order to meet their daily energy needs for months at a time before the grid infrastructure can be rebuilt. Thus, deploying mini-microgrids with an automated energy management unit is a tangible method for quickly establishing a localized power supply system that satisfies basic energy needs. See A. Khodaei, "Resiliency-Oriented Microgrid Optimal Scheduling," *IEEE Transactions on Smart Grid*, vol. 5, no. 4, pp. 1584-1591, July 2014; and S. Bahramirad, W. Reder, and A. Khodaei, "Reliability-Constrained Optimal Sizing of Energy Storage System in a Microgrid," *IEEE Transactions on Smart Grid*, vol. 3, no. 4, pp. 2056-2062, December 2012, each incorporated herein by reference in their entirety.

In addition, microgrids are ideal for other applications, such as temporary houses, military bases, aircraft carriers, and mobile homes. Often, the main grids are no longer available when people camps in remote areas or on the road. In those cases, because of the limitation on energy supply, people are more willing to manage their energy use so that their most important needs are met.

Design of microgrid controllers or energy management systems to provide grid services or minimize the customer energy bills are described in M. A. A. Pedrasa, T. D. Spooner, and I. F. MacGill, "Coordinated Scheduling of Residential Distributed Energy Resources to Optimize Smart Home Energy Services," *IEEE Transactions on Smart Grid*, vol. 1, no. 2, pp. 134-143, September 2010; M. Pipattanasomporn, M. Kuzlu, and S. Rahman, "An Algorithm for Intelligent Home Energy Management and Demand Response Analysis," *IEEE Transactions on Smart Grid*, vol. 3, no. 4, pp. 2166-2173, December 2012; P. Palensky and D. Dietrich, "Demand Side Management: Demand Response, Intelligent Energy Systems, and Smart Loads," *IEEE Transactions on Industrial Informatics*, vol. 7, no. 3, pp. 381-388, August 2011; and P. Du and N. Lu, "Appliance Commitment for Household Load Scheduling," *IEEE Transactions on Smart Grid*, vol. 2, no. 2, pp. 411-419, June 2011, each incorporated herein by reference in their entirety.

Home energy management (HEM) algorithms can manage the end use on the mini-microgrid scale (i.e., at single-family home level) under the following assumptions: (1) under normal operation, the house is connected to the main grid, (2) distributed generators (DGs) and energy storage devices are mainly used for arbitrage or providing a different type of grid services, and (3) priorities are put on maintaining the customer comfort so that shedding or postpone energy consumptions are only used as a supplemental method to meet the energy saving goals. See B. Jiang and Y. Fei, "Smart Home in Smart Microgrid: A Cost-Effective Energy Ecosystem With Intelligent Hierarchical Agents," *IEEE Transactions on Smart Grid*, vol. 6, no. 1, pp. 3-13, January 2015; H. Kanchev, D. Lu, F. Colas, V. Lazarov, and B. Francois, "Energy Management and Operational Planning of a Microgrid With a PV-Based Active Generator for Smart Grid Applications," *IEEE Transactions on Industrial Electronics*, vol. 58, no. 10, pp. 4583-4592, October 2011; X. Zhu, J. Yan, L. Dong, and N. Lu, "A Matlab-based home energy management algorithm development toolbox," in *IEEE Power and Energy Society General Meeting (PESGM)*, 2016, pp. 1-5; and Q. Hu and F. Li, "Hardware Design of Smart Home Energy Management System With Dynamic Price Response," *IEEE Transactions on Smart Grid*, vol. 4, no. 4, pp. 1878-1887, December 2013, each incorporated herein by reference in their entirety.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for managing an off-grid power supply. The method includes acquiring data from one or more loads. The one or more loads are connected to the off-grid power supply. The method further includes modeling the one or more loads based on the acquired data, estimating a state of charge of an energy storage device (ESD) associated with the off-grid power supply, and determining an operational status of each of the one or more loads. The operational status is based on at least the state of charge of the ESD and a category of each of the one or more loads. Each load is controlled based on the operational status.

The present disclosure also relates to a system for managing an off-grid power supply. The system includes an energy storage device and a controller. The controller is configured to acquire data from one or more loads connected to the energy storage device; model the one or more loads based on the acquired data; estimate a state of charge of the energy storage device; determine an operational status of each of the one or more loads based on at least the state of charge of the energy storage device and a category of each of the one or more loads; and control each load based on the determined operational status.

The present disclosure also relates to an energy storage device. The energy storage device includes a controller configured to acquire data from one or more loads connected to the energy storage device; model the one or more loads based on the acquired data; estimate a state of charge of the energy storage device; determine an operational status of each of the one or more loads based on at least the state of charge of the energy storage device and a category of each of the one or more loads; and control each load based on the determined operational status.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6A-6H are schematics that show multiple user interfaces of the mobile energy management system according to one example;

DETAILED DESCRIPTION

Figure 1:
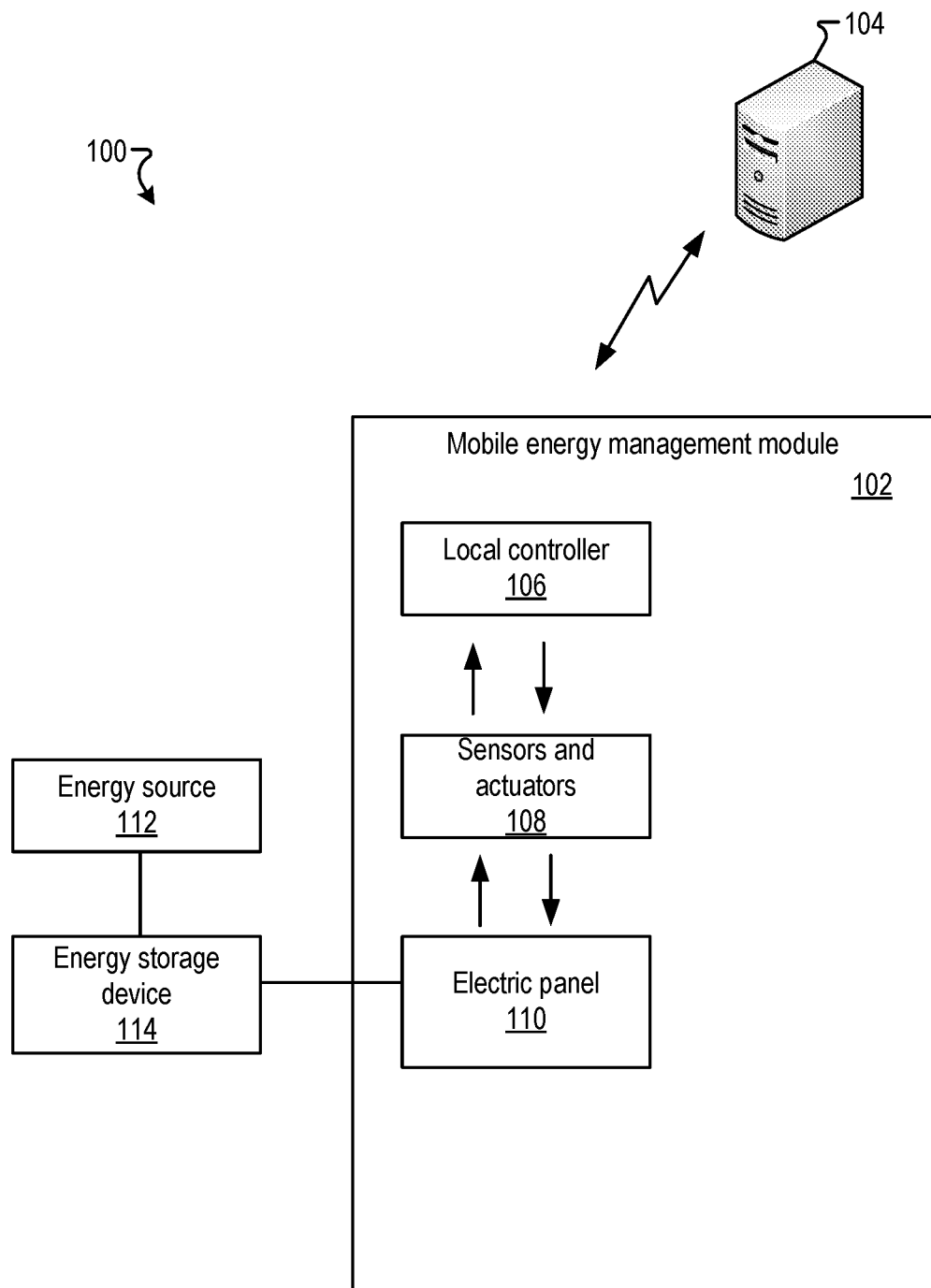
FIG. 1 is an exemplary diagram of a mobile energy management system according to one example.

Referring now to the drawings, wherein like reference numerals designate identical or corresponding parts throughout several views, the following description relates to a system, a device, and associated methodology for managing an off-grid microgrid.

A mini-microgrid may be a single-phase power supply system powered by very limited energy supply resources (e.g., a diesel generator, a battery bank, or a photovoltaic panel). Both energy capacity and power capacity have an upper limit and a lower limit such that energy consumptions in the mini-microgrid have to be carefully managed. The system described herein meets a desired power supply duration and maintains the peak load within limits of the power requirement.

In one implementation, distributed generators (DGs) and batteries are the only means for meeting electricity needs. In addition, shedding or deferring loads is the main method to meet the control objective, i.e., meeting the supply duration requirement and maintaining the minute-by-minute power consumption within its upper and lower limits.

FIG. 1 is an exemplary diagram of a mobile energy management system 100 according to one example. The system 100 may include a mobile energy management module or unit (M-EMU) 102, a controller 104, an energy source 112, and an energy storage device (ESD) 114. The ESD 114 stores energy generated by the energy source 112. The energy source 112 may be a renewable generation system such as solar photovoltaics (PVs). The renewable generation system may include a wind power generation system (e.g., wind mills), a hydraulic energy source, a micro combined heat and power (CHP) unit for heating and electricity generation, or any other energy system from renewable resources such as rain, tides, or waves. The ESD 114 may be an electrical energy storage device, a fuel cell, a thermal energy storage device, a bioelectrochemical energy storage device, a hybrid energy storage device, an uninterruptible power supply (UPS) or the like. The ESD 114 may be one or more batteries. The energy source 112 may be a grid.

The M-EMU 102 includes a local controller 106, sensors and actuators 108, an electric panel 110, and communication modules. The M-EMU 102 manages the power supply to appliances and loads connected to the electric panel 110.

The microgrid appliances can be divided into three categories: must-run base loads (e.g., lighting and computers), thermostatically controlled loads (e.g., portable refrigerators and air conditioners), and interruptible loads (e.g., fans and chargers).

All loads are controlled and monitored through the electric panel 110, which includes a predetermined number of switches and/or outlets that can be both monitored and controlled by the module 102. In one implementation, the electric panel 110 may include a minimum of three switches/outlets each corresponding to a category of the microgrid appliances. The switches are pre-ranked and pre-classified. The must-run loads are connected to a first category of switch(es) (or outlets), which have the highest priority to be supplied. The thermostatically controlled loads, which are both deferrable and interruptible, are connected to a second category of switch(es) (or outlets). The interruptible loads may be connected to a third category of switch(es)(or outlets) and have the lowest priority.

The electric panel 110 may be connected to the ESD 114. The M-EMU 102 can reside either on the ESD 114 or the electric panel 110. The M-EMU 102 manages the energy usage by monitoring and controlling the smart switches and/or outlets. The power and energy limits are determined by the status of the ESD 114 (e.g., a UPS unit). The M-EMU 102 may not control the charging of the ESD 114. Instead, the M-EMU 102 may update operational constraints based on the real-time state-of-charge (SOC) of the ESD 114.

The separation of the controlling and task monitoring of energy management system makes the M-EMU 102 design independent of the power supply side layout. The method described herein provides the advantage of a modular design by simplifying inputs and outputs of the M-EMU 102. The M-EMU 102 communicates with the ESD 114 to obtain a current charging/discharging status of the ESD 114 and SOC (e.g., connected to the main grids, connected to a PV, or connected to a diesel generator). The M-EMU 102 interfaces with the smart switches in the electric panel 110 for monitoring load conditions and issuing ON/OFF commands. As the electric panel 110 is pre-ranked and pre-classified, it simplifies the control design of the M-EMU as well as a user interface. Thus, the system 100 can automatically switch to the backup power mode or switch back to the grid connected mode.

The local controller 106 may implement a graphical user interface (GUI), SOC and load forecasting algorithms, and an energy management algorithm. The GUI allows a user to input the ESD 114 initial conditions and connection modes (e.g., off-grid, connected with a PV, connected to the main grid, or the like) when measurements from the ESD are not available.

The local controller 106 provides an intermediate link between a central controller 104 and mini-microgrid devices, including the ESD 114, the switches and the outlets of the electric panel 110, and the sensors 108. The local controller 106 can download and execute energy management algorithms from the central controller 104 with user settings integrated. The local controller 106 captures the measurement from the sensors 108, calculates the real-time consumption data or other ambient information, and controls the on/off of the smart switches and/or outlets. The local controller 106 may also report data associated with the ESD 114 and the electric panel 110 to the central controller 104.

The central controller 104 may update algorithms and data stored in the local controller 106 every predetermined period (e.g., one month), when updates are available, or when a connection via a network is available.

The sensors and actuators 108 can communicate with the local controller 106 through wireless or wired links. The sensors and actuators 108 can collect measurements such as voltage, current, power, temperature, solar radiation, or humidity. Communication modules provide the bidirectional wireless communication pathways between the central controller 104 and the local controller 106.

In one implementation, the M-EMU 102 may be connected to the energy source 112 directly when at least a dispatchable energy source such as a grid or a genset (e.g., diesel generator, a combination of diesel engine and electric generator) is available. For example, a direct connection (bypassing the ESD) to the electrical panel 110 may be implemented when at least one dispatchable energy source is connected (e.g., PV and genset) to the system.

Suitable networks can include or interface with any one or more of a local intranet, a Personal Area Network (PAN), a Local Area Network (LAN), a Wide Area Network (WAN), a Metropolitan Area Network (MAN), a Virtual Private Network (VPN), or a storage area network (SAN).

The modules described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

Figure 2A:
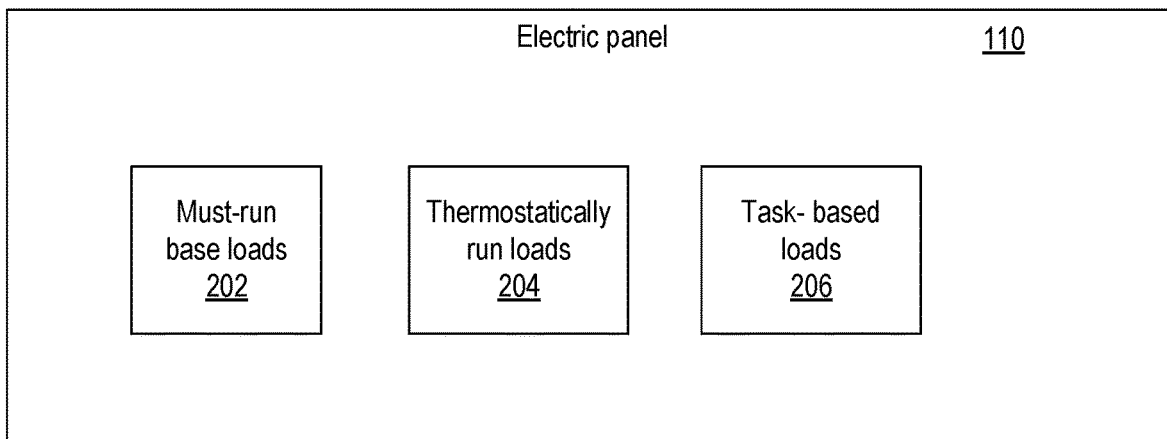
FIG. 2A is a block diagram of an electric panel according to one example.
Figure 2B:
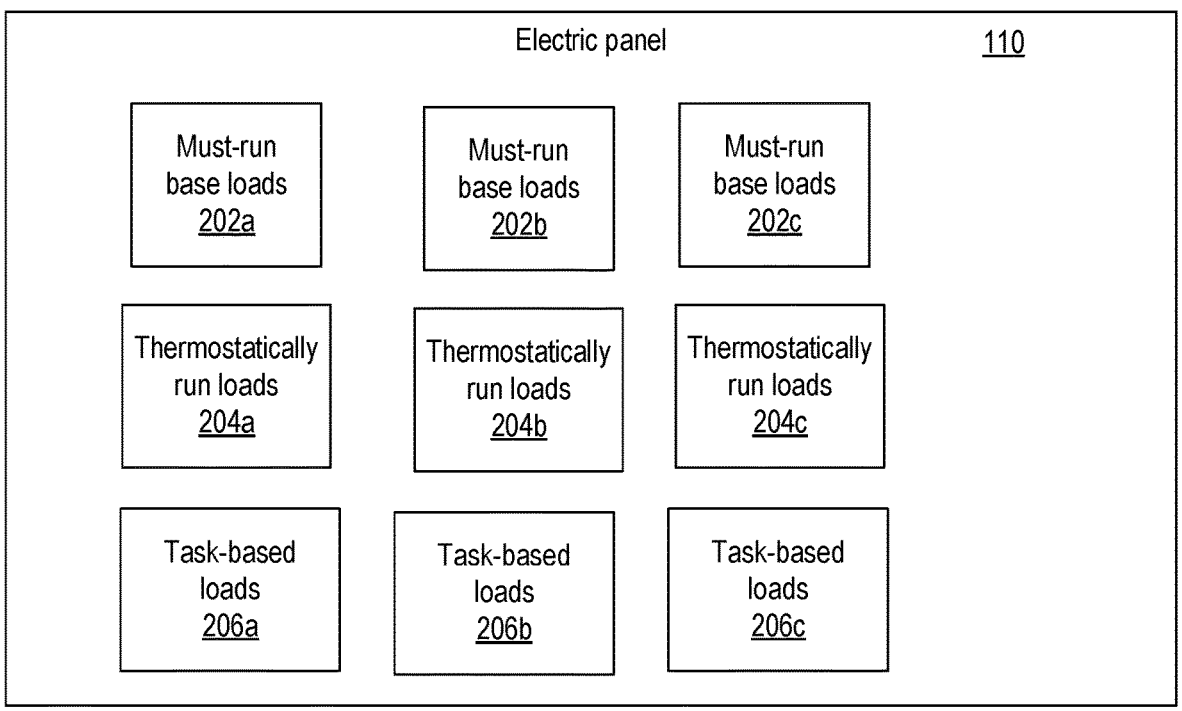
FIG. 2B is a block diagram of the electric panel according to another example.

FIG. 2A is a block diagram of the electric panel 110 according to one example. The electric panel 110 may include one or more must-run base loads switches/outlets 202, one or more TCL switches/outlets 204, and one or more interruptible loads (i.e., task-based load) switches/outlets 206. Loads are served from the highest priority to the lowest when both the power and energy storage is limited. The priority is assigned by the user when he/she chooses to plug the load to a smart switch/outlet in the electric 110. FIG. 2B is a block diagram of an electric panel 110 that includes must-run base loads, such as switches/outlets 202a, 202b, 202c, and TCL switches/outlets 204a, 204b, 204c, and task-based loads, such as switches/outlets 206a, 206b, 206c.

The local controller 106 models appliances to predict when an appliance is going to be turned "on", how long it remains "on", and the power consumption. For different energy management system (EMS) applications, the modeling approach and assumptions can be different. For example, when residential houses are connected to the main grid, appliances can be turned on and off freely when power or energy limits are less likely to be violated. However, if the energy consumption is charged at different rates based on usage or how high the peak load is, a home energy controller limits the peak and avoids energy use in high-price periods. Compared with users' comfort, the monetary savings usually are not high enough to warrant limiting the appliance usage. Therefore, the modeling of appliances is usually based on statistics derived from historical data and are influenced by customer behavioral changes.

However, both the power and energy storage are limited in a mini-microgrid so electricity consumptions may be closely monitored and controlled for reliable operation and to meet the critical loads. In most cases, the user's comfort can only be honored after the energy or power limits are met. Therefore, a data-driven appliance modeling approach to build appliance models is used based on the minute-by-minute measurements.

Unlike grid-connected residential homes, for a mini-microgrid, using historical data of previous weeks or years to forecast the load consumption may not be practical. First, the operation pattern of controllable loads is highly influenced by the M-EMU 102 control scheme. Second, consumption pattern is usually very flexible in M-EMU applications. For example, one may choose to eat cold food rather than a hot meal if the energy supply is low. Described herein is a data-driven, event-trigger appliance modeling approach to model loads based on the most recent measurements (and data) acquired from the sensors 108.

A task-based load (TBL) is a non-cyclic controllable load whose consumption needs to be completed in a duration with allowable delays. A $TBL_i$ is connected to the mini-microgrid through the task-based loads switch/outlet 206. There are two user-specified variables: priority $w_i \in [1, n_{TBL}]$ and the maximum task completion delay, $D_i$. Note that $n_{TBL}$ is the number of the activated TBL switches. The default value of $w_i$ is 1, which is the lowest priority. The default value of $D_i$ is the remaining scheduling period.

The TBL may be put on standby once it is connected to the electric panel 110. The M-EMU 102 may turn on the smart switch to supply TBL i at time $t_i^{start}$ based on the results of its scheduling algorithm. Because the M-EMU does not initially know its actual power consumption, $P_i^{act}$, or the end time, $t_i^{act\_end}$, the M-EMU 102 may first assume that the $TBL_i$ remains ON until the end of scheduling horizon $t_{end}^{sch}$. The predicted consumption $P_i^f(t)$ from $t_i^{now}$ (current time for appliance i) to the forecasting end time for the appliance i $t_i^{f\_end}$ is calculated based on the measured power consumption for appliance i $P_i^m$ and the status $s_i$ for appliance i, according to equations (1) through (4) below.

$$t_i^{f\_end} = t_{end}^{sch} \quad (1)$$

$$P_i^{AVE} = \sum_{j=t_i^{start}}^{t_i^{now}} P_i^m(j) \bigg/ \sum_{j=t_i^{start}}^{t_i^{now}} s_i(j) \quad (2)$$

$$P_{i,TBL}^f(t) = \begin{cases} P_i^{AVE} & t \in (t_i^{now}, t_i^{f\_end}] \\ 0 & t > t_i^{f\_end} \end{cases} \quad (3)$$

$$u_{i,TBL}^{allow}(t) = \begin{cases} 1 & t \in [t_i^{start}, t_i^{f\_end}] \\ 0 & \text{else} \end{cases} \quad (4)$$

where $s_i(j)$ is the status of the appliance i at time j (1 as ON and 0 as OFF), $P_i^{AVE}$ is the average power consumption when appliance i is ON, $t_i^{now}$ is the current time for appliance i and $u_{i,TBL}^{allow}(t)$ is an allowed operation indicator ("1," when the appliance is controlled by the M-EMU 102 and switching status based on scheduling, and "0" when appliance must be shut down).

If a task is completed earlier than $t_{end}^{sch}$, the M-EMU 102 updates the forecasted end time as $t_i^{f\_end} = t_i^{act\_end}$, after that $P_{i,TBL}^f(t)=0$ and $u_{i,TBL}^{allow}(t)=0$, where $t_i^{act\_end}$ is the actual time at which the task is completed. The TBL task is completed if its power consumption remains zero for more than a predetermined period (e.g., 10 minutes), which is not caused by the algorithm.

After an appliance is turned off by the local controller 106 in the middle of its operation if the appliance can resume its operation when turned on again, it is considered as an interruptible load (IL) and is modeled as:

$$P_{i,IL}^f(t) = \begin{cases} P_i^{AVE} & t \in (t_i^{now}, t_i^{interrupt}) \\ 0 & t \in [t_i^{interrupt}, t_i^{resume}) \\ P_i^{AVE} & t \in [t_i^{resume}, t_i^{f\_end}] \\ 0 & t > t_i^{f\_end} \end{cases} \quad (5)$$

Equation (5) may be also expressed as $P_i(t)=p_i(t,n) \times S_i(t)$, where $P_i(t)$ is the power of load i at time t; $S_i(t)$ is the on/off (1/0) status of load i; $p_{rated,i}$ is the rated power of $IL_i$; and $p_i(t,n)$ is the power consumption at stage n of CL i at time t; $t_i^{resume}$ is the timing the IL is ON again, and $t_i^{interrupt}$ is the timing IL is being interrupted (i.e., IL is temporarily shut down after $t_i^{interrupt}$).

If an appliance can be deferred but not interrupted, it is considered as a deferrable load (DL) and is modeled as:

$$P_{i,DL}^f(t) = \begin{cases} P_i^{AVE} & t \in (t_i^{now}, \min\{t_i^{interrupt}, t_i^{f\_end}\}) \\ 0 & t \geq \min\{t_i^{interrupt}, t_i^{f\_end}\} \end{cases} \quad (6)$$

where $P_{i,DL}^f(t)$ is the power consumption forecasting for DL i at time t in the future.

Figure 3:
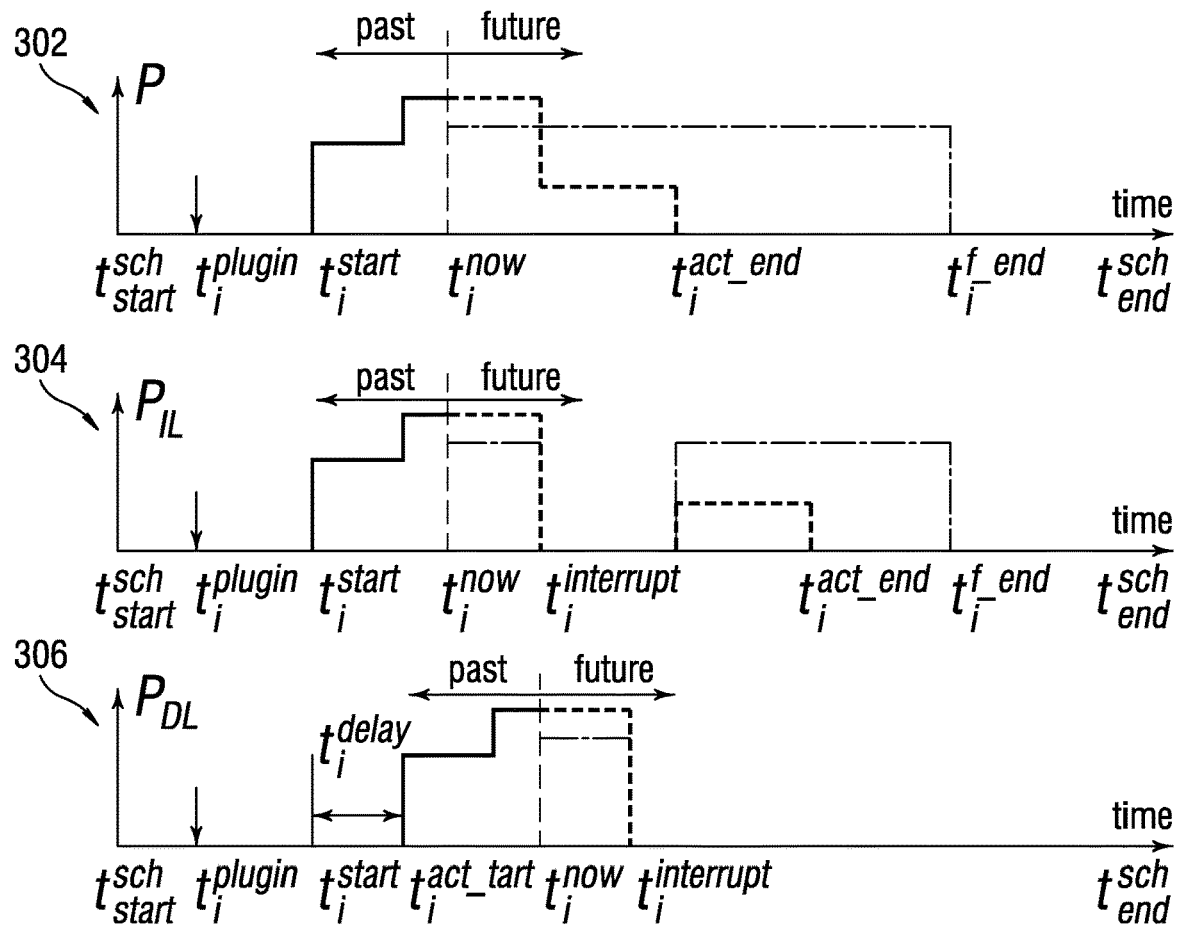
FIG. 3 is a schematic that shows task-based load modelling according to one example.

FIG. 3 is a schematic that shows task-based load modelling according to one example. Schematic 302 shows the power profile of a TBL for a scheduled period. Schematic 304 shows the power profile of an IL for the scheduled period. Schematic 306 shows the power profile of a DL for the scheduled period.

A thermostatically controlled load (TCL) may be load cycled between ON and OFF so that the temperature (e.g., the room temperature for an air conditioning unit) is controlled within a dead band during its operation. Assuming that when the $TCL_i$ is on, the TCL may consume at a constant power, $P_{i,TCL}^{rated}$, therefore forecasting TCL load at $t \in (t_i^{now}, t_{end}^{sch}]$ can be modeled as:

$$P_{i,TCL}^{AVE} = \left[\sum_{j=t_i^{start}}^{t_i^{now}} P_{i,TCL}^{rated} \times s_{i,TCL}(j)\right] \bigg/ (t_{i,TCL}^{now} - t_{i,TCL}^{start}) \quad (7)$$

$$P_{i,TCL}^f(t) = \begin{cases} P_{i,TCL}^{rated} & s_{i,TCL}(t) = 1 \\ 0 & s_{i,TCL}(t) = 0 \end{cases} \quad (8)$$

where $P_{i,TCL}^{AVE}$ is the average power consumption for TCL i after its starting time and $P_{i,TCL}^f(t)$ is the power consumption forecasting for TCL i at time t in the future.

A data-driven TCL model is developed to calculate the changing-rate of the temperature based on measurement.

$$T_{deadband} = T_{high} - T_{low} \quad (9)$$

$$k_{dec} = -T_{deadband}/t_{on} \quad (10)$$

$$k_{inc} = T_{deadband}/t_{off} \quad (11)$$

where $T_{deadband}$ is the desired temperature dead band for a TCL, $T_{high}$ is the upper desired temperature limit, $T_{low}$ is the lower desired temperature limit, $k_{dec}$ is the temperature dropping rate when a cooling TCL is ON, $k_{inc}$ is the temperature increasing rate when a cooling TCL is OFF, $t_{on}$ is the duration for which the TCL is ON, and $t_{off}$ is the duration for which the TCL is OFF.

As the ON and OFF of the TCL is controlled by the TCL switch 204, the controller 106 schedules the status $s_{i,TCL}(t)$ in $[t_i^{start}, t_{end}^{sch}]$ so that the temperature deviation is limited around a set point $T_{set}$. For an air conditioner unit, the room temperature at t during time $[t_i^{now}, t_{end}^{sch})$ can be forecasted by:

$$T_{i,TCL}^f(t+1) = \begin{cases} T_{i,TCL}^f(t) + k_{dec}\Delta t & s_{i,TCL}(t) = 1 \\ T_{i,TCL}^f(t) + k_{inc}\Delta t & s_{i,TCL}(t) = 0 \end{cases} \quad (12)$$

Figure 4:
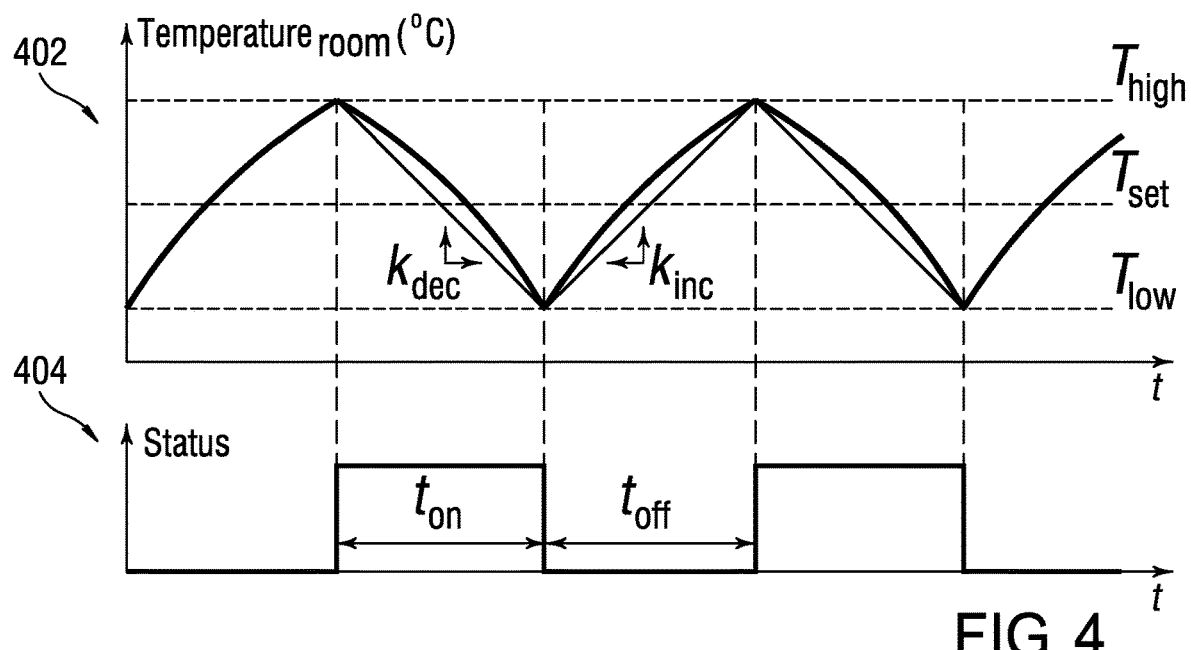
FIG. 4 is a schematic that shows a room temperature profile and the corresponding air conditioning status according to one example.

FIG. 4 is a schematic that shows the forecasted room temperature profile and the corresponding air conditioning (AC) status according to one example. Schematic 402 shows the temperature profile of a room. Schematic 404 shows a corresponding air conditioning status.

Figure 5:
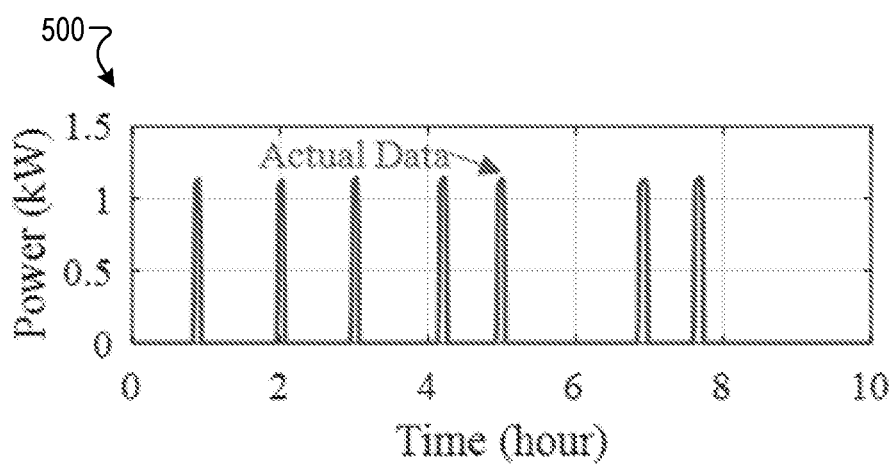
FIG. 5 is a schematic that shows a consumption profile according to one example.

FIG. 5 is a schematic 500 that shows a consumption profile according to one example. Schematic 500 shows a typical AC consumption profile. The must-run loads connected to must-run base load switch 202 have the highest priority to run, so their consumptions are considered as the base load, $P_{i,BL}^f$. The base loads are forecasted using equations (1) through (4).

The modeling of the energy storage device is formulated using data from the ESD manufacturer (e.g., American power conversion (APC) for UPS). See, e.g., P. Du and N. Lu, "Appliance commitment for household load scheduling," IEEE Transactions on Smart Grid, vol. 2, no. 2, pp. 411-419, June 2011 incorporated herein by reference in its entirety. The change of SOC(t) during time $[t_i^{now}, t_{end}^{sch})$ can be calculated as:

$$SOC(t+1) = SOC(t) - \frac{\text{sign}(P^f(t) - P_{DG}^f(t))}{\left[a \times \left(\left|P^f(t) - P_{DG}^f(t)\right|\right)^b\right]} \quad (13)$$

where a and b are the system parameters; $P^f(t)$ is the sum of all forecasted load power consumptions; $P_{DG}^f(t)$ is the total forecasted distributed generator generation at time tin the future. Note that DGs can be used to charge the battery by $P_{DG}^f(t)$, which forecasts the generation from DGs using (1)-(3), but the supply limits of mini-microgrid are set by the ESD power and energy limits. Equation (13) may also be expressed as: runtime(t)=SOC(t)×a×power(t)$^b$, where a and b are the system parameters for battery; power(t) is the power drop from the battery at time t; SOC(t) is the remaining SOC at time t; and runtime(t) is the duration that the battery can maintain this power output.

FIG. 6 is a schematic that shows a graphical user interface (GUI) 600 according to one example. The GUI 600 may be a part of a website, web portal, personal computer application, or mobile application configured to allow users to interact with the central controller 104 and the local controller 106. The GUI 600 provides an interface for a user to retrieve appliances' status and review their consumption profile. The GUI 600 displays operational statistics obtained from the local controller 106 and/or the central controller 104.

Figure 6A:
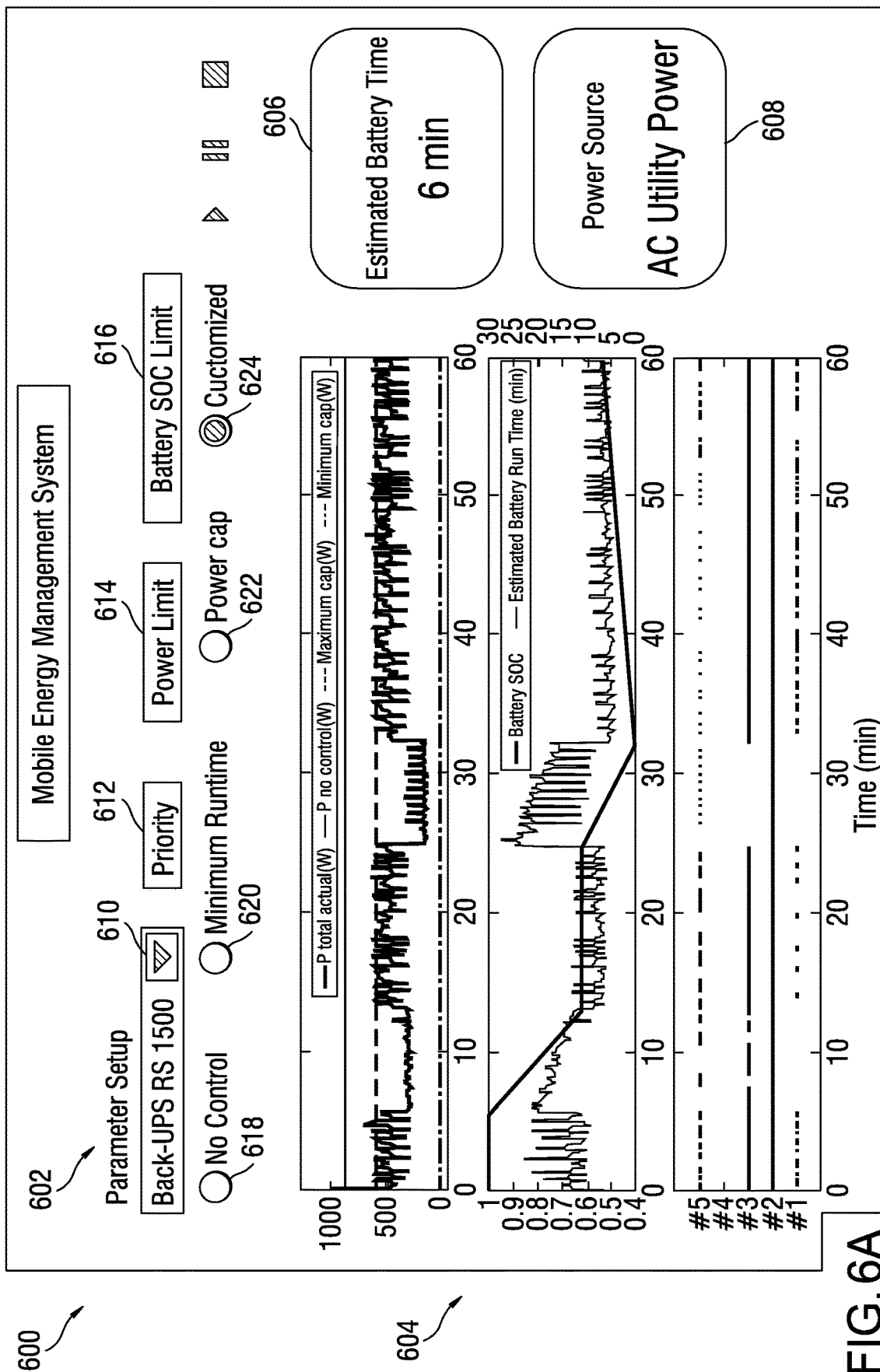
Figure 6D:
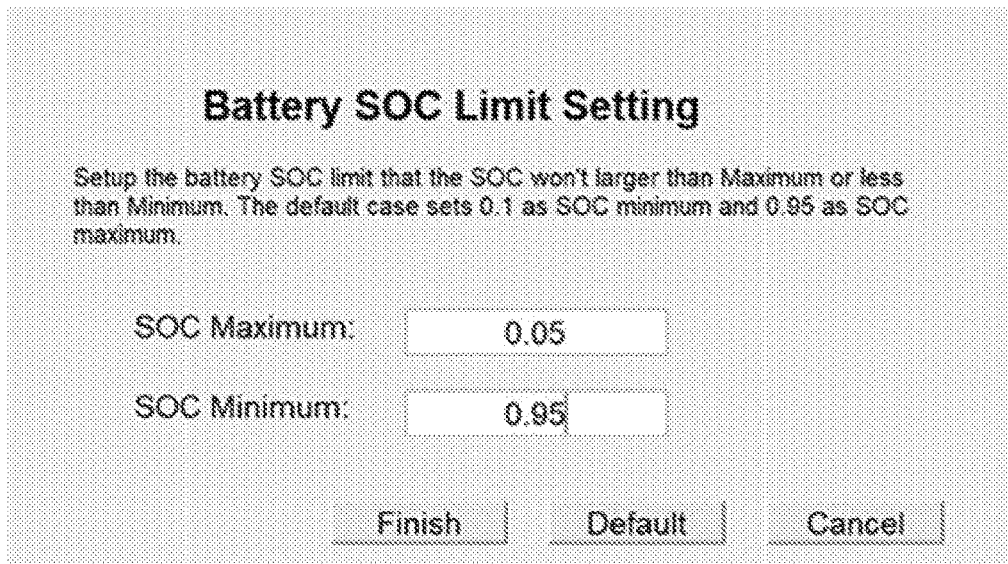

The GUI 600 may include a "parameter setup" pane 602, a display pane 604, an "estimated battery time" pane 606, and a "power source" pane 608. The "estimated battery time" pane 606 shows the estimated remaining ESD time. The "power source" pane 608 shows the current source of the power to the system 100. The display pane 604 may show the battery state of charge and the estimated battery time. The user may input setting for the system 100 using the "parameter setup" pane 602. For example, upon activation of control 610, the user may be presented with a drop-down menu, search box, or other selection control for identifying the ESD to be used. The GUI 600 may further include a priority control 612, a power limit control 614, and a battery SOC limit control 616. Upon activation of the priority control 612, the user may be presented with a setting panel for device priority. An exemplary setting panel is shown in FIG. 6B. Upon activation of the power limit control 614, the user may be presented with a setting panel for system power limit. An exemplary setting panel for system power limit is shown in FIG. 6C. Upon activation of the battery SOC limit control 616, the user may be presented with a setting panel for ESD SOC limit. An exemplary setting panel for ESD SOC limit is shown in FIG. 6D.

Figure 6E:
Figure 6F:
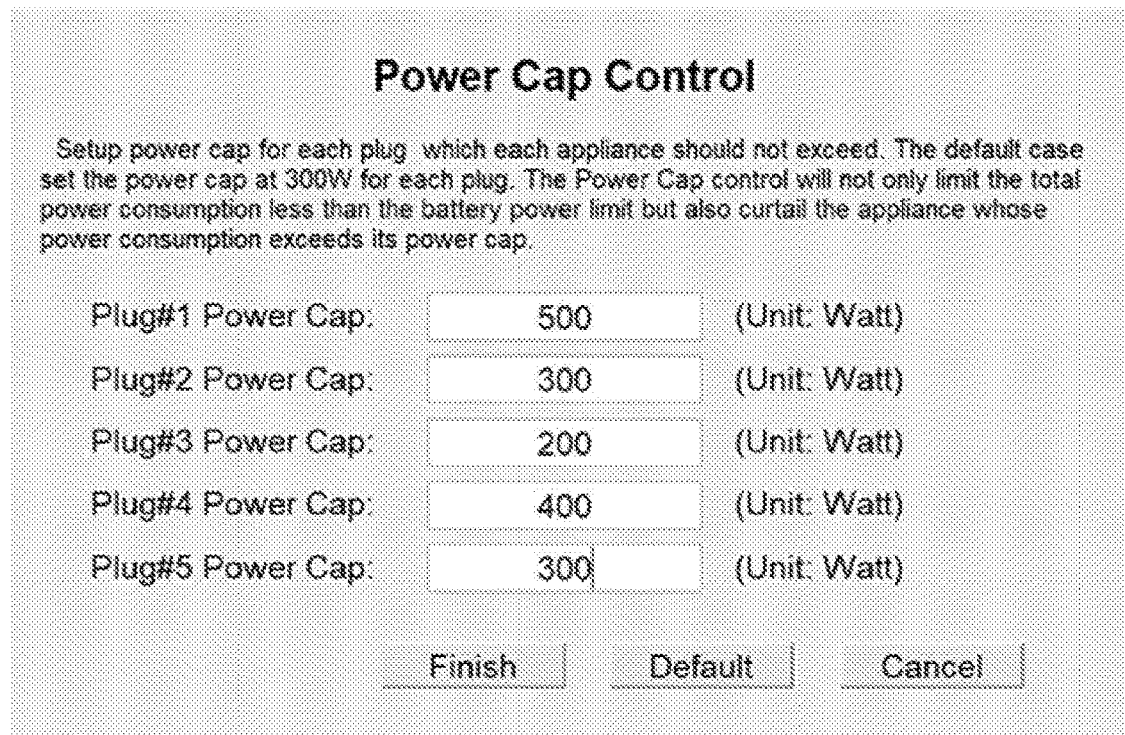
Figure 6G:
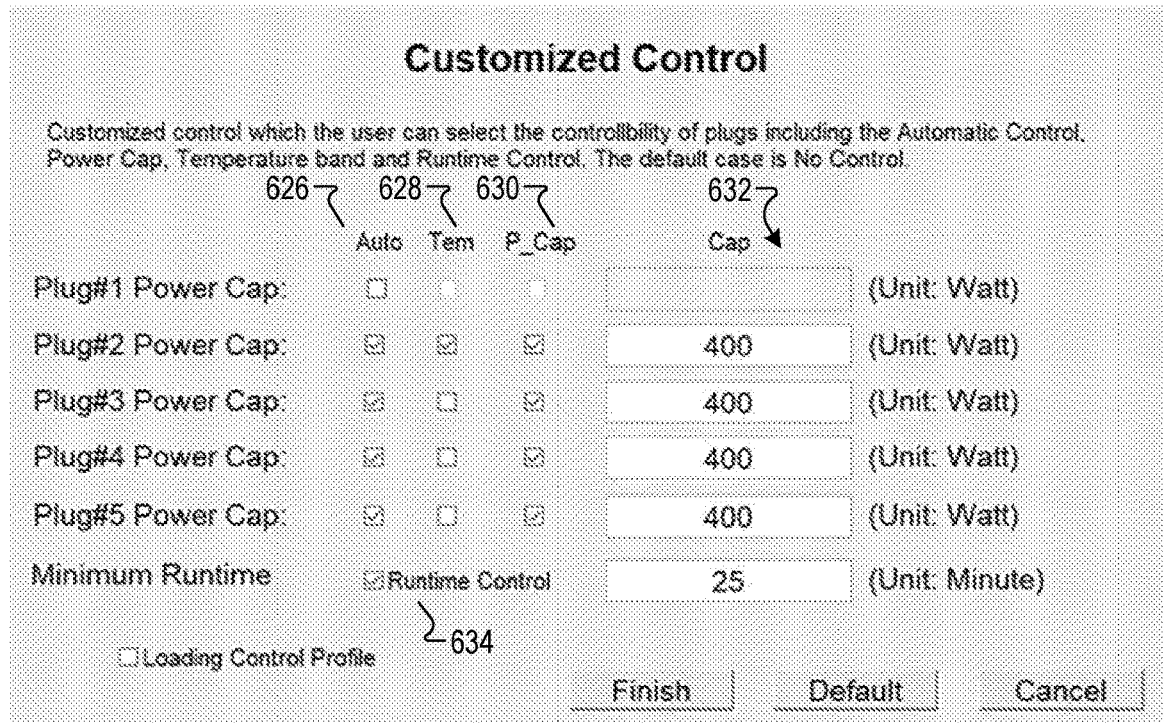
Figure 6H:
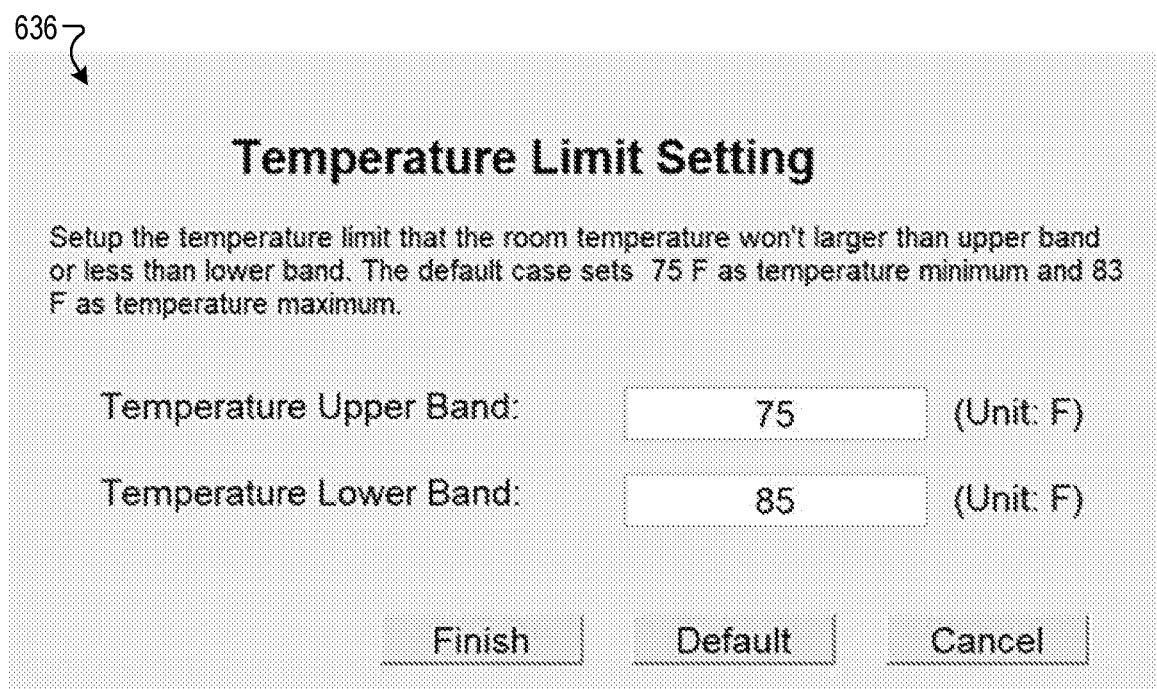

The GUI 600 may also provide different control scheme for the system. For example, the GUI 600 may include a "No control" button 618, a "Minimum runtime control" button 620, a "Power cap control" button 622, and a "Customized control" button 624. The user may select a control scheme based on a current status. For example, upon selecting the "No control" button 618, no control action is applied to any device or ESD. All devices run with their associated natural condition. The user may be presented with a pop-up panel for setting control parameters when buttons 620, 622, or 624 are activated. An exemplary control parameter setting panel for the mobile energy management system is shown in FIG. 6E. The exemplary control parameter setting panel may be presented to the user upon activating button 620. In this control scheme, the required minimum system runtime is set by the user. Upon activating button 622, the user may be presented with a control parameter setting panel for the mobile energy management system. An individual power limit is set for each load device by the user. An exemplary panel is shown in FIG. 6F. Upon activation button 624, the user may be presented with a control parameter setting panel. The user may integrate different control scheme together. An exemplary panel is shown in FIG. 6G. In FIG. 6G, the "auto" selection/checkbox 626 provides automatic control for the associated plug. Selecting/activating the "tem" selection/checkbox 628 indicates that the associated plug is connected to a thermostatically controlled load. Selecting/activating the "P_cap" selection 630 enables the cap textbox 632 for the associated plug. The user may specify the power limit for the device in the textbox. The user may also activate the runtime control 634 to set the minimum system duration requirement. FIG. 6H is a schematic that shows a user interface 636 to setup a temperature range for a device. The user interface 636 is presented to the user when the "tem" selection/checkbox 628 is activated for a device.

Figure 7:
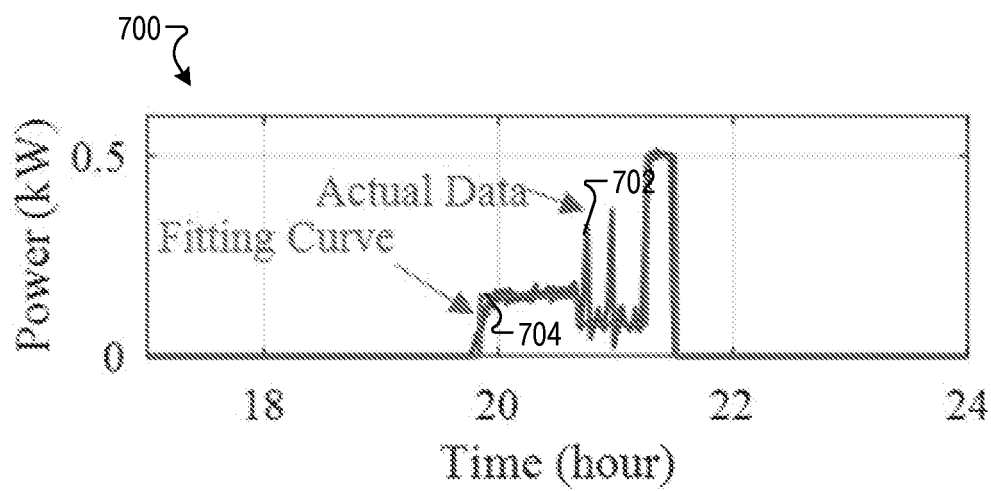
FIG. 7 is a schematic that shows modeling of washer loads according to one example.

In one implementation, when an appliance is first connected to the mini-microgrid, the appliance is connected to a calibration smart switch/outlet with measurement functions so that its power consumption, $P_{measure}(t)$, from t=[0, $\tau_{end}$] can be measured and recorded on a minute-by-minute basis or at predetermined instances. As shown in FIG. 7, curve 702 is $P_{measure}(t)$ measured from a washer cycle; and curve 704 is the derived appliance model, $P_{model}(t)$, from curve 702. As dynamic operation is not the main concern, the spikes may be ignored and the overall energy consumption should be approximately the same.

Since the mini-microgrid is designed for off-grid operation (e.g., grid outage or no grid available) with the ESD 114 as the main supply for plugged appliances, one of the essential operating parameters is the required/needed duration for the system. In one implementation, a mini-microgrid may include $N_{BL}$ must-run loads, $N_{TBL}$ TBLs, and $N_{TCL}$ TCLs. Assume that the scheduling period is T={1, 2, ..., $t_{end}^{sch}$}. The M-EMU 102 collects consumptions data of all loads through the electric panel 110 (e.g., every one minute) and updates scheduling each predetermined period (e.g., five minutes). Thus, the control objective of the M-EMU 102 is to supply the base loads and maximize user comfort.

The rolling power-cap (RPC) algorithm described herein calculates the cost of supply based on the scarcity of the resources. First, a SOC-based power cap $P_{cap}^{equi}$ is calculated at each time interval $t \in (t_i^{now}, t_{end}^{sch}]$ by:

$$P_{cap}^{equi}(t) = [(t_{end}^{sch} - t)/(SOC(t) \times a)]^{1/b} \quad (14)$$

The load aggregation based penalty ratio, B(t), may be calculated by applying equation (15). Note that the primary objective of the method described herein is to guarantee the supply duration for the user, therefore whenever the DGs are available, the DGs may be utilized as much as possible and the M-EMU 102 may support more loads.

$$B(t) = \frac{-P_{DG}^f(t) + \sum_{n \in \{N_{BL}, N_{TBL}, N_{TCL}\}} P_n^f(t) \times s_n(t)}{P_{cap}^{equi}(t)} \quad (15)$$

The penalty functions for the task delay and temperature set point with priority $w_{j,TBL}$ and $W_{k,TCL}$ are calculated as:

$$c_{j,TBL}(t) = 0.5 \times w_{j,TBL} \times [s_{j,TBL}(t) - u_{j,TBL}^{allow}(t)]^2 \quad (16)$$

$$c_{k,TCL}(t) = 0.5 \times w_{k,TCL} \times [T_{k,TBL}(t) - T_{k,set}]^2 \quad (17)$$

where $c_{j,TBL}(t)$ and $c_{k,TCL}(t)$ are the penalty of discomfort for TBL j and TCL k respectively, $T_{k,set}$ is the temperature setpoint for TCL k, and $w_{j,TBL}$, $w_{k,TCL}$ are the preset priority for TBL j and TCL k respectively.

Thus, the mini-microgrid optimal energy management (OEM) problem for a mini-microgrid powered by mobile energy storage units can be formulated as:

$$\min \sum_{t=t^{now}+1}^{t_{end}^{sch}} \left\{ \begin{array}{l} \sum_{i=1}^{N_{BL}} [B(t) \times P_i^f(t) \times s_i(t)] + \\ \sum_{j=1}^{N_{TBL}} [B(t) \times P_j^f(t) \times s_j(t) + c_j(t)] + \\ \sum_{k=1}^{N_{TCL}} [B(t) \times P_k^{rated} \times s_k(t) + c_k(t)] \end{array} \right\} \quad (18)$$

s.t. $\sum_{n \in \{N_{BL}, N_{TBL}, N_{TCL}\}} P_n^f(t) \times s_n(t) \leq P_{ESD}^{max}$ (19)

$\sum_{t \in T} [u_{j,TBL}^{allow}(t) - s_{j,TBL}(t)] \leq D_{j,TBL}$ (20)

Note that equation (19) limits the total power consumption of the mini-microgrid to be less than the battery power limit, $P_{ESD}^{max}$; and equation (20) limits the maximum device delay time to be within $D_{i,TBL}$.

At the beginning of each predetermined period, the local controller 106 receives measurements from the electric panel 110. Then, the local controller 106 may determine an updated load forecast for each load using equations (1)-(3) and (7). The local controller 106 estimates the SOC of the ESD 114 using equation (13). Note that when calculating the SOC of the ESD 114, the consumptions of the TCLs are estimated using the average power $P_{k,TCL}^{AVE}$ to simplify the calculation as the energy, not the power, is of concern. If the SOC($t_{end}^{sch}$) is less than the threshold SOC$_{ESD}^{limit}$, the local controller 106 may reduce the run time of the TBL with the lowest priority by $t^{minus}$=5 minutes (or other predetermined period) until the SOC limits can be satisfied.

If shutting down one TBL is not enough, the next one on the bottom of the priority list may be selected by the local controller 106. Each time, the $t_i^{f\_end}$ of the TBL is updated as equation (21).

$$t_i^{f\_end} = \begin{cases} t_i^{f\_end} - t_i^{minus} & t_i^{f\_end} - t_i^{minus} > t_i^{now} \\ t_i^{now} & t_i^{f\_end} - t_i^{minus} \leq t_i^{now} \end{cases} \quad (21)$$

After the SOC limit is satisfied, the rolling power cap scheduling (R-PCap) algorithm defined by (14)-(20) may be solved iteratively. The algorithm is summarized as Algorithm 1.

---

Algorithm 1: Rolling Power Cap Scheduling

Input: Minimum duration T; maximum iteration number $N_{iteration}^{Max}$; error tolerance $\varepsilon > 0$.
Output: Scheduling command $s_i(t)$, $i \in \{N_{BL}, N_{TBL}, N_{TCL}\}$, $t \in (t_i^{now}, t_{end}^{sch}]$.
1. Initialize the "price" and iteration indicator $n_{iter}$ as:
$B^0(t) = (-P_{DG}^f(t) + \Sigma_{i \in \{N_{BL}, N_{TBL}, N_{TCL}\}} P_i^f(t))/P_{ESD}^{max}$,
$t \in (t_i^{now}, t_{end}^{sch}]$, $n_{iter} \leftarrow 0$

---

Algorithm 1: Rolling Power Cap Scheduling

2. M-EMU finds a new status sequence $s_i^{niter+1}(t)$ for each load from the solution of the OEM problem defined by (18).
3. Update forecasting power $P_i^f(t)$ based on $s_i^{niter+1}(t)$. For each TBL, use (5)-(6). For each TCL, use (8).
4. Calculate $B^{niter+1}(t)$ by (14), (15).
5. if $|B^{niter+1}(t) - B^{niter}(t)| \leq \varepsilon$ and then return $s_i^{niter+1}(t)$. end if
6. if $n_{iter} < N_{iteration}^{Max}$ and then $n_{iter} \leftarrow n_{iter} + 1$ and go back to step 2 else return $s_i^{N_{iteration}^{Max}}(t)$. end if

---

Next, a rule-based scheduling algorithm is described, which helps to explore the satisfactory backup duration given the perfect control of the different appliances while respecting to the occupants' settings and constraints. The overview of algorithms is listed in Table I. Algorithms 2-4 may be implemented by the local controller 106.

TABLE I

Brief description of algorithms

| Algorithm | Description |
| --- | --- |
| Algorithm 2 | Plug power cap control for each appliance |
| Algorithm 3 | Power cap control for the total power consumption |
| Algorithm 4 | SOC-based microgrid backup duration control |

Details of Algorithm 2: The plug power cap control runs when the load controller 106 updates the appliance measurement at each time slot. Each plug has its own power limit. If the plugged appliance has a higher power level than the limit then it will be turned off.

---

Algorithm 2 Plug Power Cap Control

Input: Power cap $P_{cap, i}$, appliance and measurement $P_i$ (t) and dispatch command $C_i$ (t).
Output: Appliance dispatch command $C_i$ (t).
1:    for each appliance do
2:        if $P_i > P_{cap, i}$ then
3:            $C_i$ (t) ← 0 end if
4:    end for

---

Figure 8:
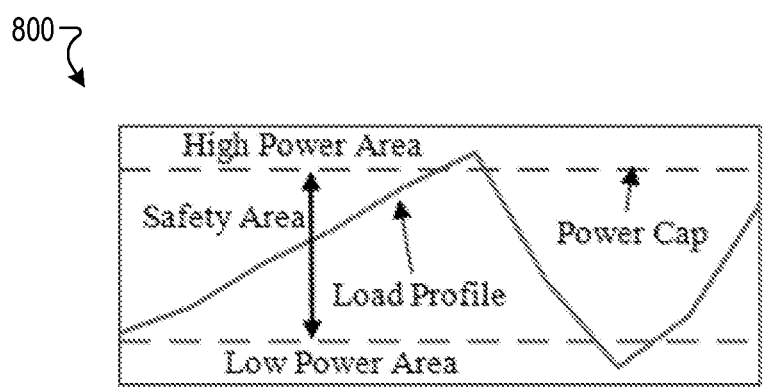
FIG. 8 is a schematic that shows an illustration of power cap control according to one example.

Details of Algorithm 3: If a total power cap $P_{cap}$ is decided for the microgrid system, then a power cap control is implemented. The basic idea for this algorithm is keeping the total power consumption close to the safety area as well as maintaining the temperature within the range. As shown in FIG. 8, when total power reaches the "High Power Area", the running appliance with the lowest priority is turned OFF; whereas when the total power is lower than the "Safety Area", the non-running appliance with the highest priority is turned ON. Moreover, the local controller 106 may "pre-cool" or "pre-heat" space when energy is sufficient or inadequate. The user can setup the trigger point via the GUI 600 by setting up the parameter α and β in Algorithm 3.

| Algorithm 3 Power Cap Control |
| --- |
| Input: Power cap $P_{cap}$, a priority list for n appliances, appliance dispatch command $C_i$ (t), measurement $P_i$ (t) or $T_i$ (t), temperature range $[T_{lower, i}, T_{upper, i}]$, and average power Paverage i for appliance i, safety band $P_{safety}$ for the system.<br>Output: Appliance dispatch command $C_i$ (t).<br>1:    $O^t \leftarrow \{i \in n: C_i(t) = 1\}$<br>2:    $\Delta^t \leftarrow \{i \in n: C_i(t) = 0\}$<br>3:    Calculate total power consumption $P_{sum}(t)$<br>4:    $P_{sum}(t) = \Sigma n\ i=1\ P_i(t) \times C_i(t)$<br>5:    if $P_{sum}(t) > P_{cap}$ then<br>6:        while $P_{sum}(t) > P_{cap}$ and $O^t \neq \emptyset$ do<br>7:            Select lowest priority appliance i which is running<br>8:            if appliance i is TCL then<br>9:                if $T_{lower, i} < T_i(t) < [(1-\alpha) \times T_{lower, i} + \alpha \times T_{upper, i}]$ then<br>10:                  $C_i$ (t) $\leftarrow$ 0 end if<br>11:            else $C_i$(t) $\leftarrow$ 0 end if<br>12:            $P_{sum}(t) = \Sigma n\ i=1\ P_i(t) \times C_i(t)$<br>13:            $O^t \leftarrow O^t \setminus \{i\}$ end while<br>14:    else if $P_{sum}(t) < (P_{cap} - P_{safety})$ then<br>15:        while $P_{sum}(t) < (P_{cap} - P_{safety})$ and $(\Delta^t \neq \emptyset)$ do<br>16:            Select highest priority appliance i which is shut down<br>17:            if appliance i is TCL then<br>18:                if $[(1-\beta) \times T_{lower, i} + \beta \times T_{upper, i}] < T_i(t) < T_{upper, i}$ then<br>19:                  $C_i$ (t) $\leftarrow$ 1 end if<br>20:            else<br>21:                if $P_i(t) < P_{cap, i}$ and Paverage i < $P_{cap, i}$ then<br>22:                  $C_i$(t) $\leftarrow$ 1 and $P_i$(t) $\leftarrow$ Paverage i end if<br>23:            end if<br>24:            $P_{sum}(t) = \Sigma n\ i=1\ P_i(t) \times C_i(t)$<br>25:            $\Delta^t \leftarrow \Delta^t \setminus \{i\}$ end while<br>26:    else $C_i(t) \leftarrow C_i(t)$ for all appliances<br>27:    end if |

Details of Algorithm 4: Algorithm 4 is the main function of local controller 106. The controller 106 updates appliance measurement results at the beginning of every time step and then runs different control algorithm based on the grid status. The microgrid control described herein not only can be applied to provide a suitable backup duration during grid failure but also can be used to achieve load curtailment for demand response event if power limit signal is received.

| Algorithm 4 SOC-based Microgrid Backup Duration Control |
| --- |
| input: Power limit for each plug and the total consumption ($P_{cap, i}$ and $P_{total}$), priority list for each appliance, battery minimum SOC limit ($SOC_{min}$), customer backup duration requirement $T_{required}$ and sampling interval $T_{step}$, and the required temperature range for appliance i ($[T_{lower, i}, T_{upper, i}]$) if appliance i is a TCL.<br>Output: Appliance dispatch command $C_i$(t).<br>1:    while running the algorithm do<br>2:        Update battery SOC(t), appliance average power Paverage i and appliance measurement $P_i$(t) or $T_i$(t) and their status $S_i$(t)<br>3:        Set control command $C_i$(t) $\leftarrow$ $S_i$(t)<br>4:        run Plug Power Cap Control<br>5:        if power outage then<br>6:            runtime(t) = runtime(t) − $T_{step}$<br>7:            Calculate new power cap Poutage cap,i(t)<br>8:            Poutage cap,i(t) = $[\text{runtime}(t)/(SOC(t) \times a)]^{1/b}$<br>9:            run Power Cap Control with the cap Poutage cap,i(t)<br>10:        else<br>11:            runtime(t) = $T_{required}$<br>12:            run Power Cap Control with the cap $P_{total}$ end if<br>13:        Set t = t + 1<br>14:    end while |

The M-EMU 102 maximizes user comfort. The user comfort may be quantified to illustrate the effect of the control algorithm described herein. For base loads (BLs), the required operation time is the complete scheduling horizon, the user comfort of the BL, $UC_{BL}$, is defined as:

$$UC_{BL} = \Pi_{i=1}^{N_{BL}} \left[ \Sigma_{t \in T} s_{i,BL}(t) \Delta t / t_{end}^{sch} \right] \quad (22)$$

For TBLs, the comfort is evaluated by how much delay and interruption is caused. So, if the required operation time is $\tau_{TBL}$, the user comfort of the TBL, $UC_{TBL}$, is calculated as:

$$UC_{TBL} = \frac{\sum_{j=1}^{N_{TBL}} w_{j,TBL} \left[ \frac{\sum_{t \in T} s_{j,TBL}(t) \Delta t}{\tau_{j,TBL}} \right] \left[ \frac{\tau_{j,TBL}}{\sum_{t \in T} u_{j,TBL}^{allow}(t) \Delta t} \right]}{\sum_{j=1}^{N_{TBL}} w_{j,TBL}} \quad (23)$$

In one implementation, an acceptable temperature is set to $T_{set} \pm 2°$ C. for each TCL. Thus, the thermal comfort, $UC_{TCL}$, is formulated as:

$$UC_{TCL} = \frac{\sum_{k=1}^{N_{TCL}} \sum_{t=1}^{t_{end}^{sch}} w_{k,TCL} \left[ \begin{array}{l} \max(T_{k,TCL}(t) - (T_{set} + 2), 0) + \\ \max((T_{set} - 2) - T_{k,TCL}(t), 0) \end{array} \right] \Delta t}{t_{end}^{sch} \sum_{k=1}^{N_{TCL}} w_{k,TCL}} \quad (24)$$

Therefore, the total user comfort, $UC_{total}$ may be expressed as:

$$UC_{total} = \frac{UC_{BL} 1 + UC_{TBL}}{21 + UC_{TCL}} \quad (25)$$

Figure 9:
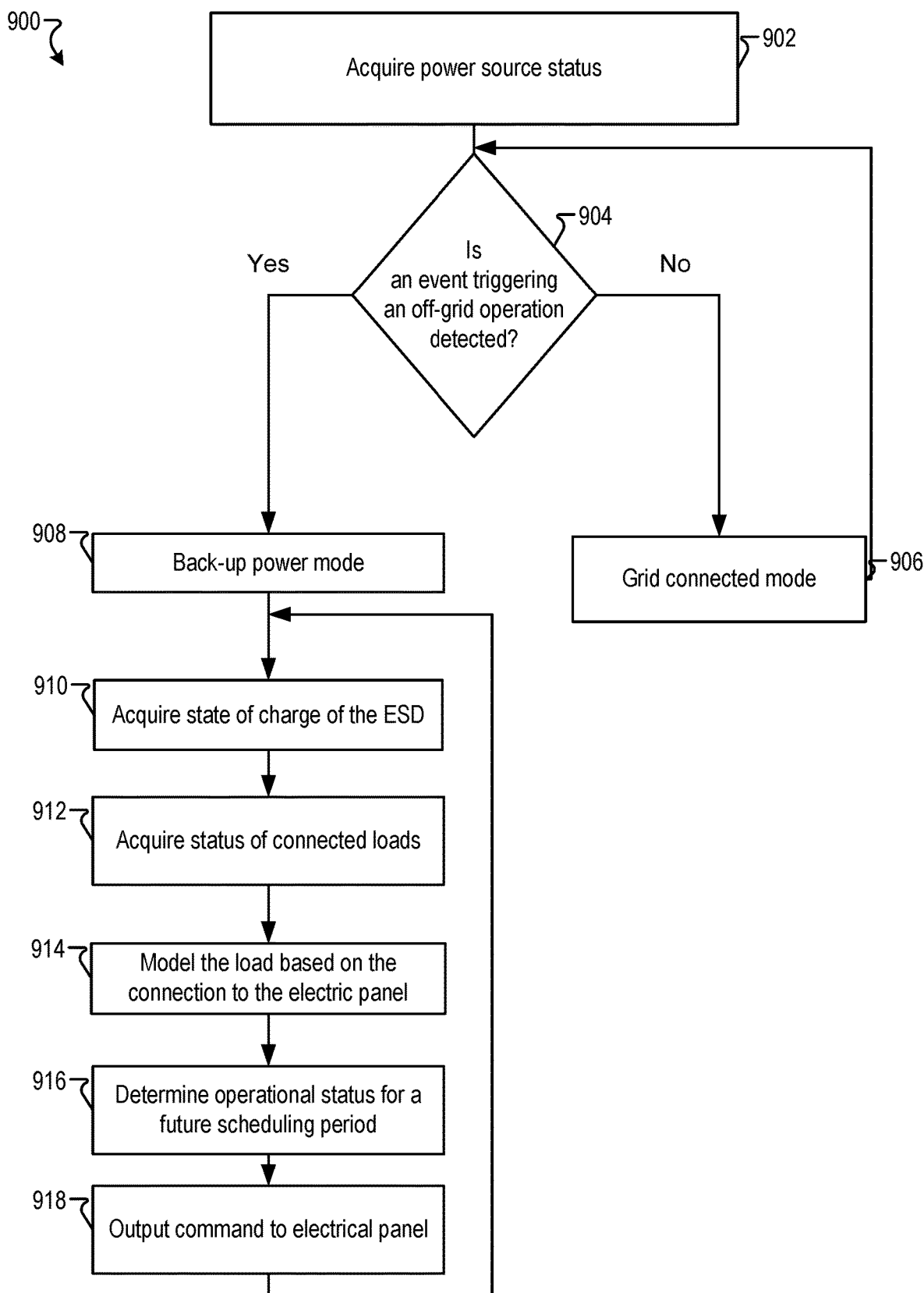
FIG. 9 is a flowchart for a method for managing an off-grid microgrid according to one example.

FIG. 9 is a flowchart 900 that shows a method for managing an off-grid microgrid according to one example. The method may be implemented by the local controller 106. At step 902, the local controller 106 may acquire a power source status. For example, the local controller 106 may determine whether power from the main grid or other power generators is available. In one implementation, the local controller 106 may check to see whether an input from a user indicates a power outage or a scheduled power outage. The user may input the total duration of the outage or the desired operation period.

At step 904, in response to detecting an event triggering the off-grid operation (e.g., no power from the grid), the process proceeds to step 908. In response to determining that no event triggering an off-grid operation is detected, the process proceeds to step 906. At step 906, the system 100 is operated in a grid connected mode.

At step 908, the system 100 is operated is a back-up power mode. At step 910, the local controller 106 acquires the state of charge of the ESD via the sensors 108. At step 912, the local controller 106 acquires the status of the connected loads (e.g., appliances). For example, the local controller 106 may determine the number of loads/appliances connected to the electric panel 110.

At step 914, the local controller 106 may model each of the load/appliance connected to the electric panel 110 based on the category of the switch/outlet associated with the load as described previously herein.

At step 916, the local controller 106 may determine the operational status for the next scheduling period. For example, the local controller 106 may implement the SOC-based microgrid backup duration control described previously herein. Steps 910 through 918 are repeated every predetermined period (e.g., 5 minutes) until the local controller 106 runs the grid connected mode when the power is restored, for example.

To illustrate the capabilities of the system and associated methodology described herein, exemplary results are presented.

Minute-by-minute sub-metered appliance consumption profiles are used in the exemplary simulations. Those data were collected by the Pecan Street project from the residential houses in Austin, Tex. A summary of the loads is given in Table II. GUROBI™, a commercial mathematical software, is used to solve equation (18) to obtain the ON/OFF status $s_n(t)$ of each load.

The $UC_{total}$ between the controlled and non-controlled (NC) cases is compared with different durations requirements: 4, 6, and 8 hours. For the NC cases, TCLs and TBLs are turned ON/OFF based on the device level controller without any interference from the M-EMU 102. In the controlled cases, the M-EMU 102 implements the R-PCap algorithm and manages the TCLs and TBLs based on predetermined priority of running those loads. For the controlled case, the model-based forecasting mechanism described herein (the RP cases in Table III) is compared with the prefect forecast (the RP-PF cases in Table III). This results in the nine test cases in Table III.

Figure 10:
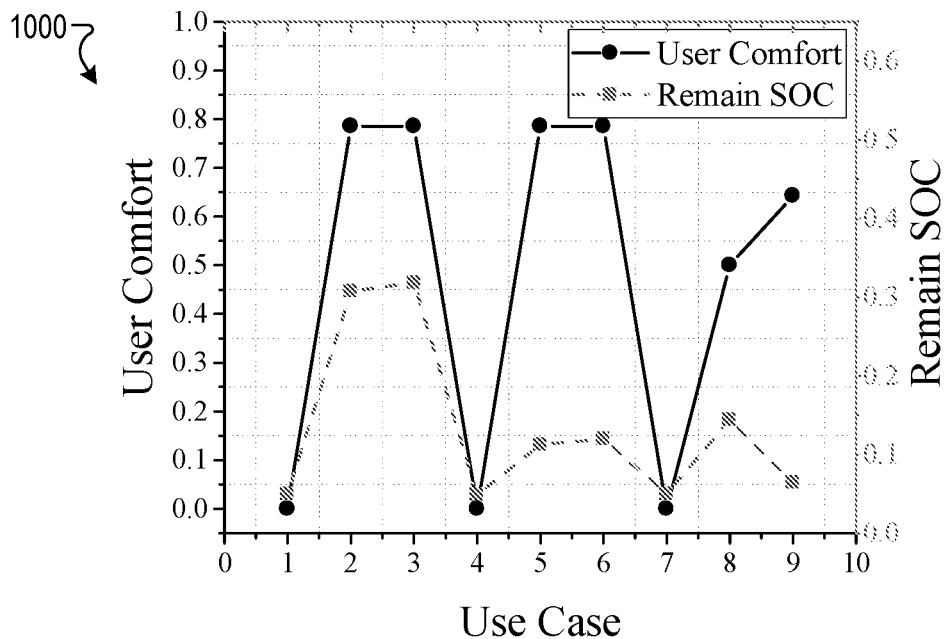
FIG. 10 is a schematic that shows the energy storage device state and the corresponding user comfort profile according to one example.
Figure 11:
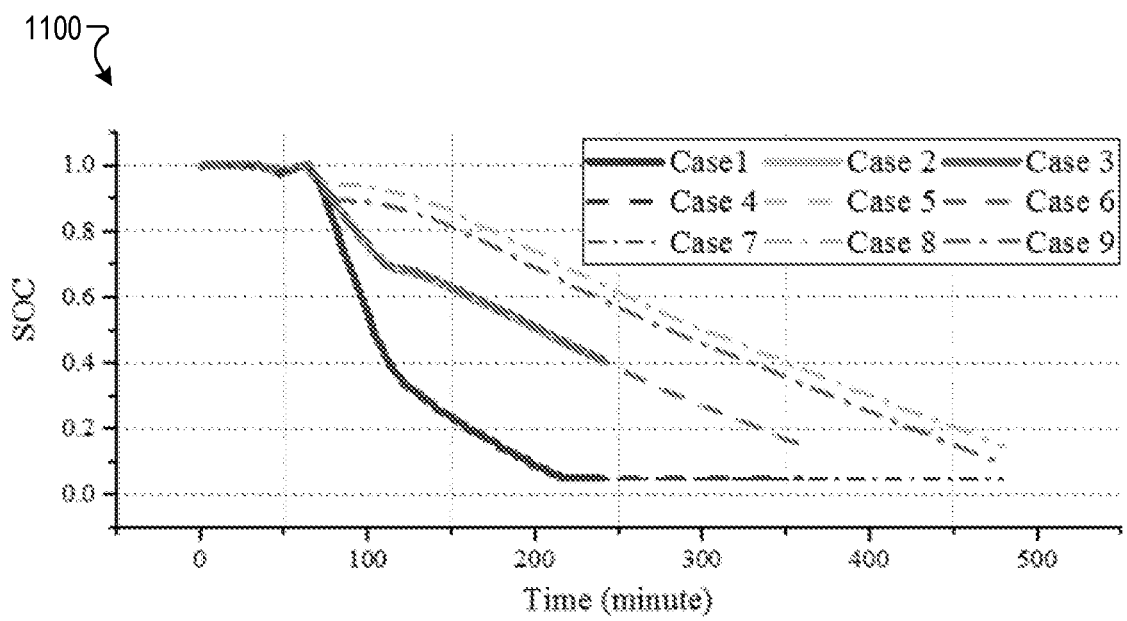
FIG. 11 is a schematic that shows the state of charge of the energy storage device for multiple test cases according to one example.

FIG. 10 is a schematic that shows the energy storage device state and the user comfort profile according to one example. Schematic 1000 shows the total user comfort and the battery SOC changes at the end of the scheduling period. The SOC curve for each case is plotted in FIG. 11. Compared with the NC cases (i.e., cases 1, 4 and 7), the M-EMU 102 successfully controlled the status of each appliance to meet the supply duration requirements. At the beginning stage, the solar generation is sufficient to support the loads and the ESD 114 started to discharge after 18:00. If the supply duration is 4 or 6 hours, the controlled case optimizes the user comfort so the overall comfort level is much higher than the non-controlled case by letting the deferrable load complete its cycles and minimizing the interruption to the interruptible load.

However, if the supply duration is extended to 8-hours, to guarantee the supply duration of the must-run load, the TCL and TBL loads will be sacrificed by being turned off most of the time. This results in a significant drop of the user comfort level compared with previous controlled cases. The remaining SOC is also very low. The model-based forecasting algorithm performs well when supply durations are 4 and 6 hours. However, if the supply duration is 8 hours, the supply resource is operated at its limit, having perfect forecast of each load can result in a better scheduling that leads to a higher comfort level at the end of the supply duration.

In another example, a small scale hardware implementation was demonstrated and conducted in a lab environment with a system prototype and actual load emulator.

Two identical Arduino™ boards were used as the local controller 106 for the prototype. These are multi-purpose load controllers for both measurement sampling and command executing. A ZigBee™ communication module and a sensor with a 10 A relay were also utilized. A programmable light bulb bank was built to simulate a base load. By programming the microcontroller, different base load profiles can be generated for the microgrid. A UPS serves as energy storage for the system. The prototype also provides a panel for the customer to plug their appliances.

As discussed previously herein, the microgrid system focuses on controlling the power-intensive load, which may include AC, dryer, water heater, and the like. Due to the limitations of using the actual appliance in a lab environment, some appliances which have similar operating features are utilized to showcase the functionality of the microgrid controller. It is assumed that the operation duration for microgrid is 40 minutes with a power outage from 21 to 30 minutes. Five independent appliances are plugged into the front panel including a TCL and a priority list is assigned for each plug. The battery SOC is calculated by measuring the output power. The scenarios assumptions are summarized in Table IV.

TABLE II

Microgrid Parameter Setup

| Type | Description |
|---|---|
| Base Load | Aggregated plugged load from living room, bedroom, bathroom, and light. (Max: 0.5 kW) |
| Deferrable Load 1 | Small washer (Max: 0.4 kW and priority: 3) |
| Deferrable Load 2 | Small dryer (Max: 1.4 kW and priority: 2) |
| Interruptible Load | EV charging load (Max: 1.3 kW and priority: 1) |
| Thermal Load | Air conditioning (Max: 1.2 W, $T_{set}$: 28° C. and $T_{out}$: 35° C.) |
| Energy Storage Device | $a = 200$, $b = -1.024$, $P^{max}_{ESD} = 10$ kW |
| Distributed Generation | PV panel (Max: 2 kW) |
| Simulation Start Time | 17:00, Sept. 22, 2016 |

TABLE III

Test cases setup

| Case 1 | Case 2 | Case 3 | Case 4 | Case 5 |
|---|---|---|---|---|
| NC-4h | RP-4h | RP-PF-4h | NC-6h | RP-6h |
| Case 6 | | Case 7 | Case 8 | Case 9 |
| RP-PF-6h | | NC-8h | RP-8h | RP-PF-8h |

TABLE IV

Microgrid parameter setup

| System Parameter | Value |
| --- | --- |
| Experiment Duration | 40 minutes |
| Outage Duration | 10 minutes |
| Duration Requirement | 10 minutes |
| Battery Setting | a = 7149, b = −1.024 |
| Total Power Cap | 700 W |
| Plug 1 | Base load simulator, maximum 360 W |
| Plug 2 | Small AC, temperature from 75° F. to 83° F., 200 W |
| Plug 3 | Lighting, IL, 200 W |
| Plug 4 | Washer simulator (fan), CL, maximum 200 W |
| Plug 5 | Small slow cooker, CL, maximum 200 W |
| Priority Setting | Plug 1 > Plug 3 > Plug 2 > Plug 5 > Plug 4 |
| AC Setting | $\alpha = \beta = 0.5$ |

An experiment is conducted based on the microgrid prototype. Three scenarios are considered: No Control, Power Cap, and SOC-based Power Cap.

Figure 12:
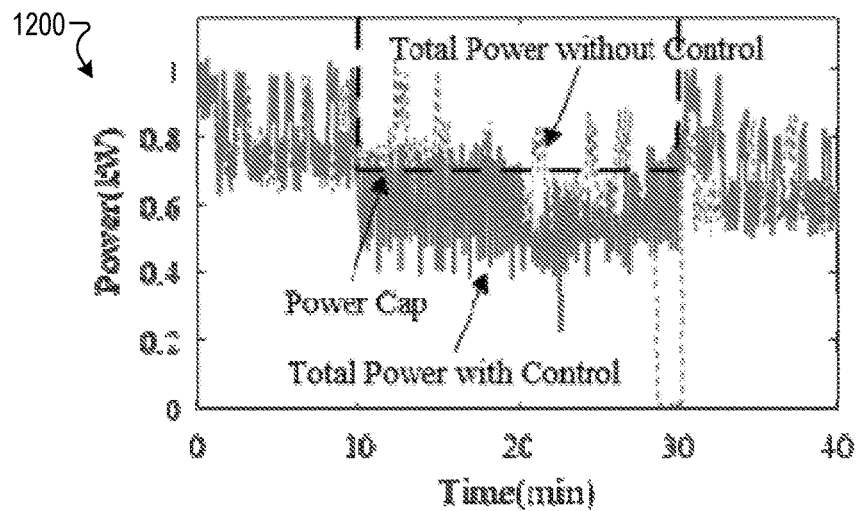
FIG. 12 is a schematic that shows measurement data from the microgrid controller according to one example.

Scenario 1: No Control. As shown in FIG. 12, the first 10 minutes is the base case without any power limit or grid failure. Due to the operation of AC, the total power consumption has several pulses in this span and the total power exceeds the system's power cap which is 700W. The battery is idle and the room temperature is limited within the given range regardless if algorithm control is used or not. It is noticeable that, due to the sufficient energy and the algorithm settings of $\alpha$ and $\beta$, an AC with algorithm control will be turned on in advance when the room temperature reaches the middle point (about 26.5° C.) of the given range. So the room temperature actually is limited to the bottom area (about from 23.4 to 26.5° C.) of the range. The last 10 minute is the recovery stage from the outage.

Figure 14:
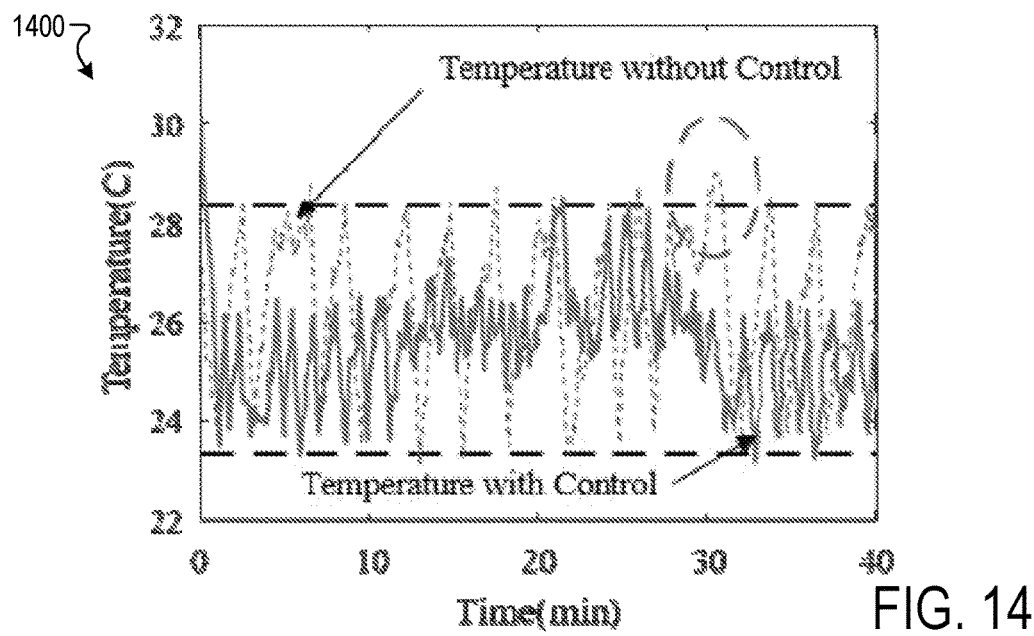
FIG. 14 is a schematic that shows a room temperature profile according to one example.

Scenario 2: Power Cap. As shown in schematic 1200 of FIG. 12 with the Power Cap control, the load curtailment occurs between the 11 to 20 minutes. This is because, during this period, the total power of AC (200 W), lighting (200 W), and base load (maximum 360 W) almost reached or exceeded the power limit. When the base load is low or the AC unit is shut down, in order to keep the total household consumption below the limit, only one of the washer or cooking device may be activated. On the other hand, when the temperature is higher than the trigger point, space can be pre-cooled when sufficient energy is available. When the temperature is lower than the trigger point, microgrid controller may shut down the AC in advance and turn on other appliances which may have a higher or lower priority so that the relay time for CL can be reduced. The room is kept in the center of the given range (about from 24.6 to 27.3° C.) as shown in schematic 1400 of FIG. 14.

Figure 13:
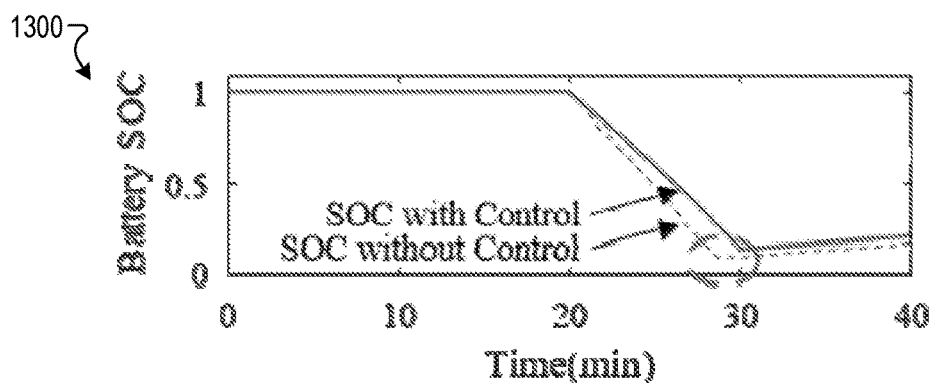
FIG. 13 is a schematic that shows the energy storage device sate of charge according to one example.
Figure 15:
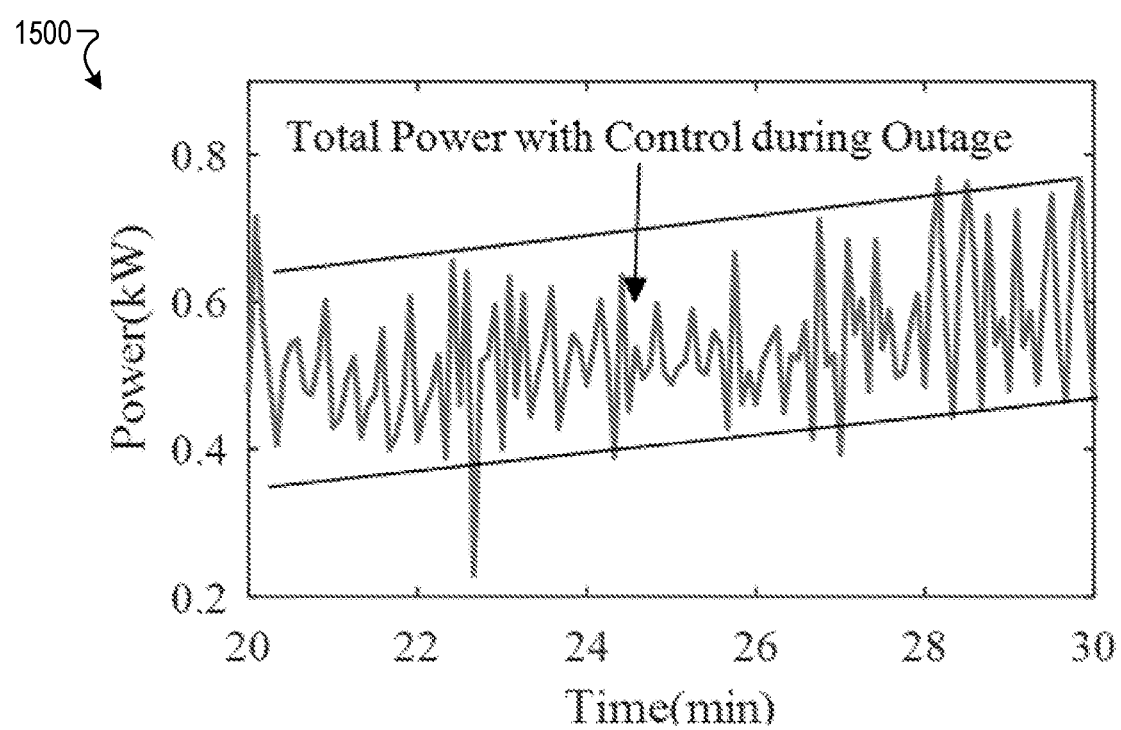
FIG. 15 is a schematic that shows the system total power consumption during an outage according to one example.

Scenario 3: SOC-based Power Cap. The microgrid system is assumed to experience a grid failure of 20 to 30 minutes. During the outage, a dynamic power limit is calculated by the load controller using equation 4 and applied to the microgrid. Due to the decrease of remaining duration requirement, it is obvious that there is ascending trend for the power limit as shown in schematic 1500 of FIG. 15. Moreover, compared to the "No Control" case of schematic 1300 in FIG. 13, the battery SOC with control does not reach the lower limit which means the microgrid system is not activated in a total outage mode and appliances can maintain their operation. At the beginning stage of the outage, due to the insufficient energy, although the temperature is higher than the preset trigger point, the microgrid controller does not turn on AC until the temperature reaches the upper limit. When the temperature drops lower than the trigger point, AC is switched OFF and then lower priority appliance can have enough energy to be ON. At the end of the outage, the microgrid controller has a larger dynamic power cap than before, so that more appliances can be turned on and the temperature may reach the lower area as Scenario 1. During the whole outage, the microgrid controller can maintain a reasonable range of the temperature, whereas the temperature without control will exceed the range given that the battery will run out of energy.

In some implementations, the processes associated with each of the modules may be performed by one or more processors of the controller 104 or other computing resources, which can include cloud computing resources.

Figure 16:
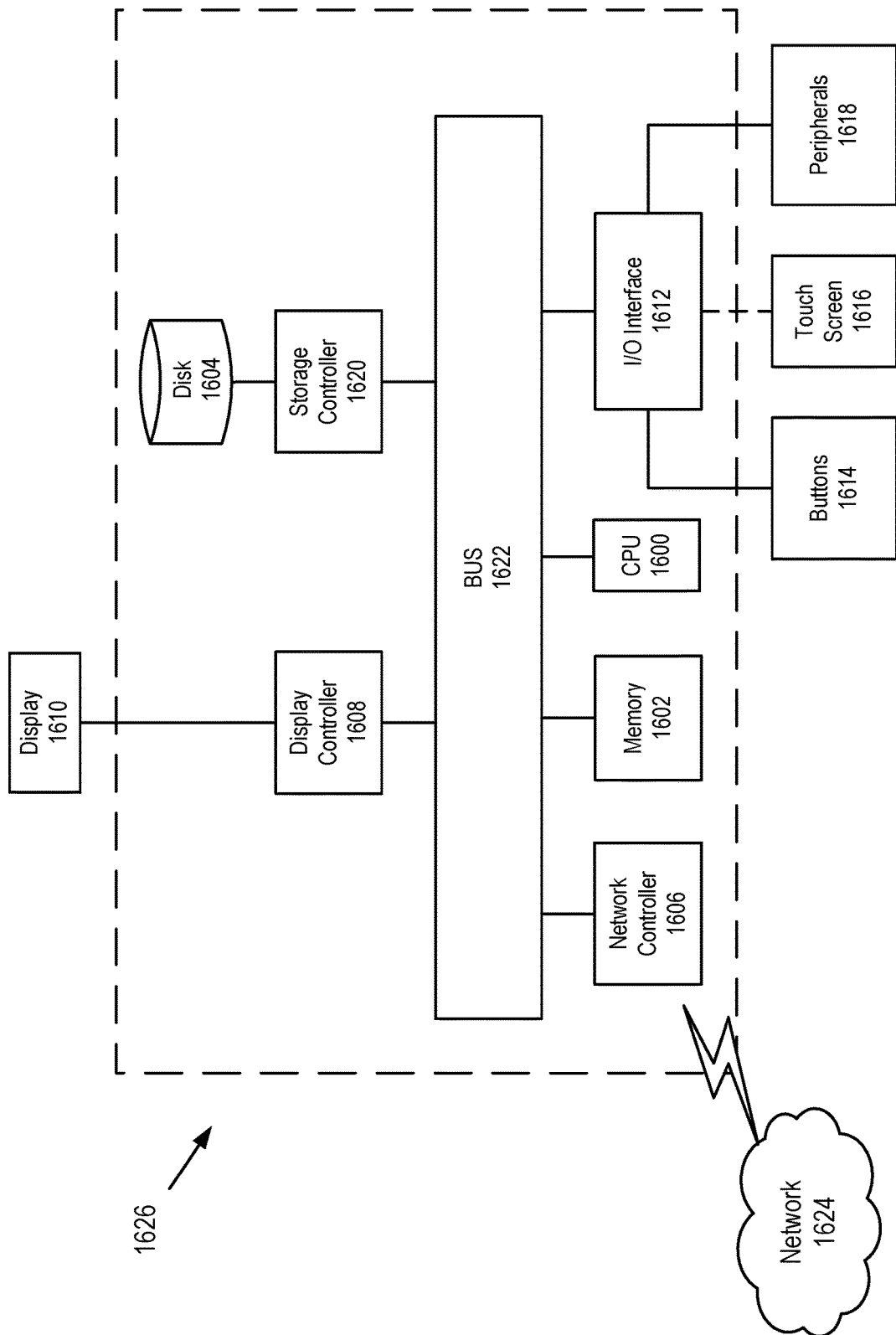
FIG. 16 is an exemplary block diagram of a computer according to one example.

In one implementation, the functions and processes of the local controller 106 may be implemented by a computer 1626. Next, a hardware description of the computer 1626 according to exemplary embodiments is described with reference to FIG. 16. In FIG. 16, the computer 1626 includes a CPU 1600 which performs the processes described herein. The process data and instructions may be stored in memory 1602. These processes and instructions may also be stored on a storage medium disk 1604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1626 communicates, such as a server or computer.

Further, the claimed advancements may be provided as a utility application, background daemon, or component of an operating system, or combination thereof, executing in conjunction with CPU 1600 and an operating system such as Microsoft® Windows®, UNIX®, Oracle® Solaris, LINUX®, Apple macOS® and other systems known to those skilled in the art.

In order to achieve the computer 1626, the hardware elements may be realized by various circuitry elements, known to those skilled in the art. For example, CPU 1600 may be a Xenon® or Core® processor from Intel®, or an Opteron® processor from Advanced Micro Devices (AMD), or may be other processor types that would be recognized by one of ordinary skill in the art. Alternatively, the CPU 1600 may be implemented on an FPGA, ASIC, PLD or using discrete logic circuits, as one of ordinary skill in the art would recognize. Further, CPU 1600 may be implemented as multiple processors cooperatively working in parallel to perform the instructions of the inventive processes described above.

The computer 1626 in FIG. 16 also includes a network controller 1606, such as an Intel® Ethernet PRO network interface card from Intel Corporation of America, for interfacing with network 1624. As can be appreciated, the network 1624 can be a public network, such as the Internet, or a private network such as LAN or WAN network, or any combination thereof and can also include PSTN or ISDN sub-networks. The network 1624 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1626 further includes a display controller 1608, such as a NVIDIA® GeForce® GTX or Quadro® graphics adaptor from NVIDIA® for interfacing with display 1610, such as a Hewlett Packard® HPL2445w LCD monitor. A general purpose I/O interface 1612 interfaces with a keyboard and/or mouse 1614 as well as an optional touch screen panel 1616 on or separate from display 1610. General purpose I/O interface also connects to a variety of peripherals 1618 including printers and scanners, such as an OfficeJet® or DeskJet® from Hewlett Packard®.

The general purpose storage controller 1620 connects the storage medium disk 1604 with communication bus 1622, which may be an ISA, EISA, VESA, PCI, or similar, for interconnecting all of the components of the computer 1626. A description of the general features and functionality of the display 1610, keyboard and/or mouse 1614, as well as the display controller 1608, storage controller 1620, network controller 1606, and general purpose I/O interface 1612 is omitted herein for brevity as these features are known.

Figure 17:
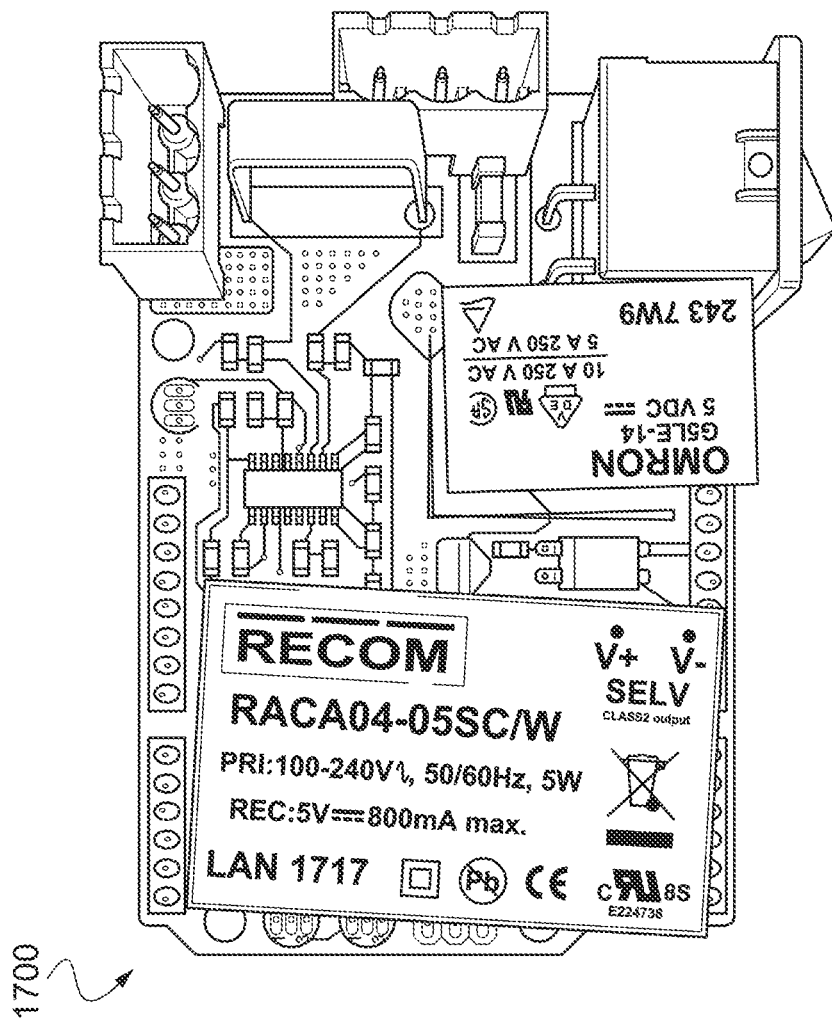
FIG. 17 is a schematic that shows a smart switch prototype according to one example.

FIG. 17 is a schematic that shows a smart switch prototype according to one example. The smart switch 1700 may be included in the electric panel 110. The smart switch 1700 is designed to provide functionalities such as on/off status control, power monitoring, and multiple sensing. The smart switch 1700 includes a manual switch, so the user can control the on/off status manually. The smart switch 1700 also can receive a control command from the local controller 106 or the central controller 104 and switch a relay module to achieve automatic control. The smart switch 1700 includes three analog channels for power monitoring: voltage, small current (less than 1 A), and large current (larger than 1 A). The smart switch 1700 may also include three additional analog channels for multiple sensors. For example, the smart switch 1700 may include a temperature sensor when the smart switch 1700 is connected to a thermostatically controlled load.

Figure 18A:
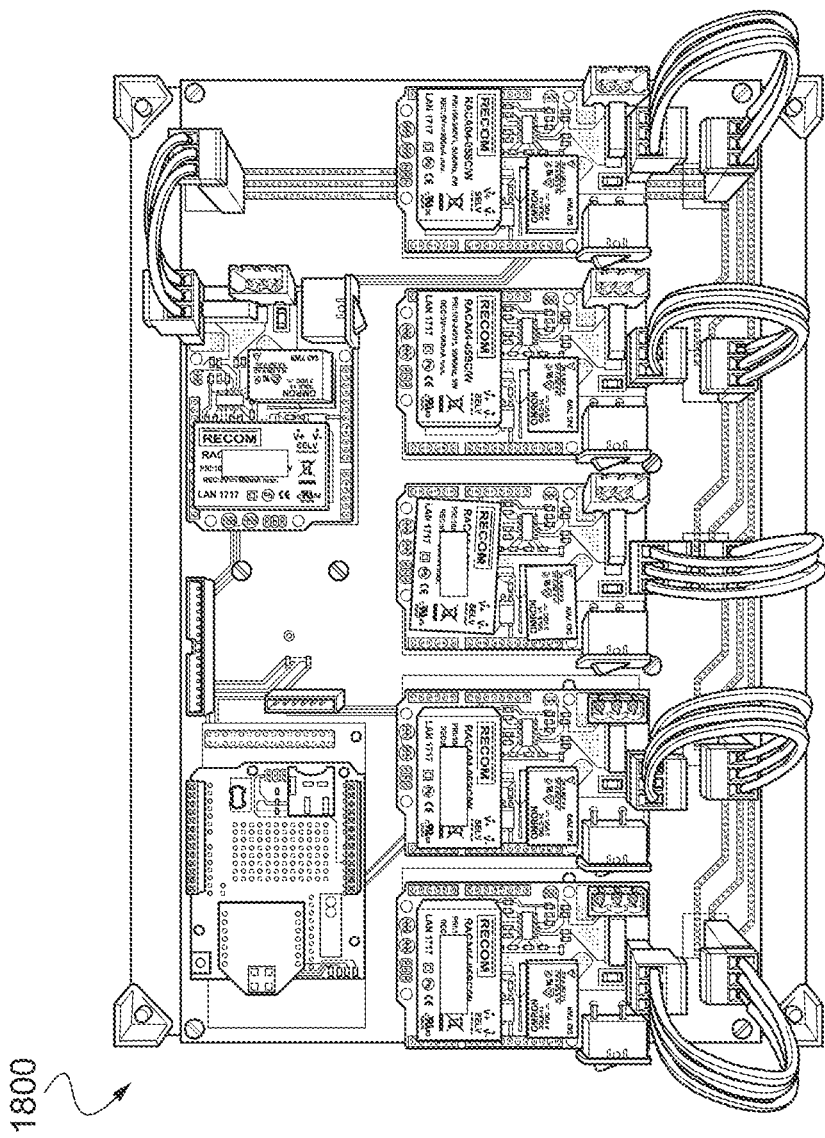
FIGS. 18A and 18B are schematics that show a mobile energy management module prototype according to one example.
Figure 18B:
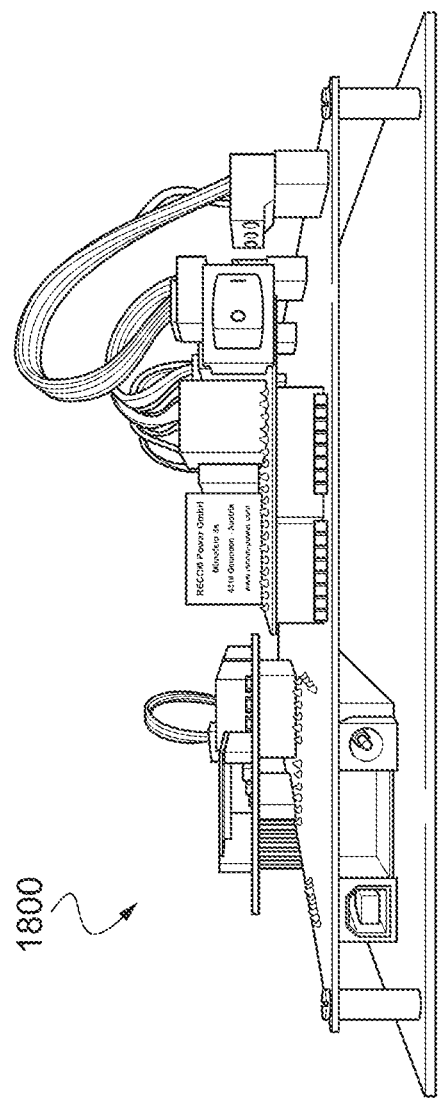

FIGS. 18A and 18B are schematics that show a mobile energy management module prototype 1800 according to one example. The prototype includes six smart switches such as the smart switch shown in FIG. 17. The smart switches may be associated with a battery and five different loads. The power monitoring and sensor measurement data can be transferred to the central controller 104 through a ZigBee™ communication module or the onboard local controller 106 through the copper circuit.

Figure 19:
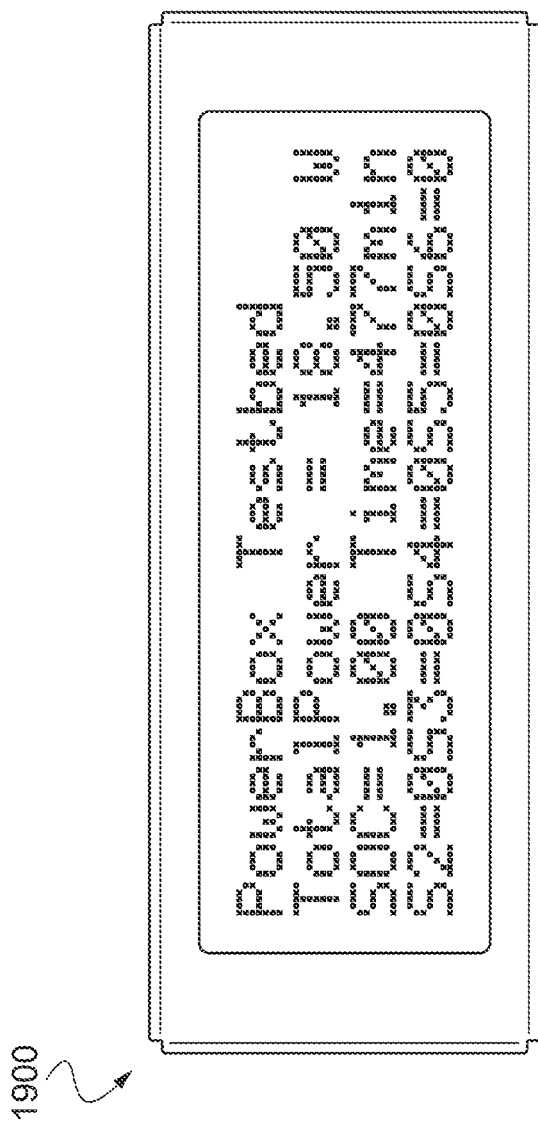
FIG. 19 is a schematic that shows a light emitting diode (LED) user interface according to one example.

FIG. 19 is a schematic that shows a light emitting diode (LED) user interface 1900 according to one example. As shown in FIG. 19, the LED user interface 1900 may display the remaining SOC of battery, the remaining backup time of the system, and the status for each device. The user can setup different parameters through the LED screen.

The features of the present disclosure provide a multitude of improvements in the technical field of microgrid management. In particular, the controller identifies an operation mode for each of a plurality of switches and outlets based on the state of charge of the ESD for the next predetermined period. The methodology described herein could not be implemented by a human due to the sheer complexity of data, gathering, and calculating, and includes a variety of novel features and elements that result is significantly more than any abstract idea. The method described herein may be used with different types of loads (e.g., base loads, TCL, and task-based loads). Thus, the implementations described herein improve the functionality of the ESD. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A method for managing an off-grid power supply, the method including acquiring data from one or more loads connected to the off-grid power supply; modeling, using processing circuitry, the one or more loads based on the acquired data; estimating, using the processing circuitry, a state of charge of an energy storage device (ESD) associated with the off-grid power supply; determining, using the processing circuitry, an operational status of each of the one or more loads based on at least the state of charge of the ESD and a category of each of the one or more loads; and controlling each load based on the determined operational status.

(2) The method of feature (1), further including, identifying a parameter value as a trigger point according to the state of charge of the energy storage device for a thermostatic load, wherein the thermostatic load is switched on and off according to thermostatic parameters using the identified parameter value as the trigger point.

(3) The method of feature (2), further including, determining upper and lower limits for the thermostatic parameters that are different than other upper and lower limits for the thermostatic parameters when the thermostatic load is connected to a non-dispatchable power source.

(4) The method of any of features (1) to (3), in which the controlling the load includes: controlling a power supply to one or more switches and outlets of an electric panel.

(5) The method of feature (4), in which the electric panel includes switches and/or outlets associated with a plurality of switch and outlet categories, each category associated with a priority of the one or more loads.

(6) The method of feature (5), in which the switch and outlet categories include one or more loads of task-based loads (TBL), thermostatically run loads, and must-run loads.

(7) The method of feature (6), further including identifying a TBL load having a lowest priority among the one or more loads; and reducing a run time of the TBL when the state of charge of the ESD is less than a state of charge threshold limit.

(8) The method of feature (6), further including controlling a thermostatically run load for a current scheduling period when an indication of a power cap for a future scheduling period is received.

(9) The method of any of features (5) to (8), further including determining a power cap for each of the switches and/or outlets; and deactivating a switch or an outlet when power measurement from a load connected to the switch or the outlet exceeds the determined power cap.

(10) The method of any of features (4) to (9), in which the electric panel further includes a calibration smart switch and/or outlet configured to acquire power consumption of at least one load connected to the calibration switch and/or the outlet at predetermined instances.

(11) The method of any of features (1) to (10), further including determining a power cap limit; determining a total power consumption; identifying a load with a lowest priority when the determined total power consumption exceeds the determined power cap limit; turning off power supply to the load with the lowest priority when the determined total power consumption exceeds the determined power cap limit; identifying a second load with a highest priority when the determined total power consumption is less than the determined power cap limit; and activating power supply to the second load with the highest priority when the determined total power consumption is less than the determined power cap limit.

(12) An energy storage device including a controller configured to acquire data from one or more loads connected to the energy storage device (ESD); model the one or more loads based on the acquired data; estimate a state of charge of the ESD; determine an operational status of each of the one or more loads based on at least the state of charge of the ESD and a category of each of the one or more loads; and control each load based on the determined operational status.

(13) The device of feature (12), in which the controller is further configured to identify a parameter value as a trigger point according to the state of charge of the energy storage device for a thermostatic load, wherein the thermostatic load is switched on and off according to thermostatic parameters using the identified parameter value as the trigger point.

(14) The device of feature (13), in which the controller is further configured to determine upper and lower limits for the thermostatic parameters that are different than other upper and lower limits for the thermostatic parameters when the thermostatic load is connected to a non-dispatchable power source.

(15) The device of any of features (12) to (14), in which the controlling of the load includes: controlling a power supply to one or more switches and outlets of an electric panel.

(16) The device of feature (15), in which the electric panel includes switches and/or outlets associated with a plurality of switch and outlet categories, each category associated with a priority of the one or more loads.

(17) The device of feature (16), in which the switch and outlet categories include one or more loads of task-based loads (TBL), thermostatically run loads, and must-run loads.

(18) The device of feature (17), in which the controller is further configured to identify a TBL load having a lowest priority among the one or more loads; and reduce a run time of the TBL when the state of charge of the ESD is less than a state of charge threshold limit.

(19) The device of feature (18), in which the controller is further configured to control a thermostatically run load for a current scheduling period when an indication of a power cap for a future scheduling period is received.

(20) The device of any of features (16) to (19), in which the controller is further configured to determine a power cap for each of the switches and/or outlets; and deactivate a switch or an outlet when power measurement from a load connected to the switch or the outlet exceeds the determined power cap.

(21) The device of any of features (15) to (19), in which the electric panel further includes a calibration smart switch and/or outlet configured to acquire power consumption of at least one load connected to the calibration switch and/or the outlet at predetermined instances.

(22) The device of any of features (12) to (21), in which the controller is further configured to determine a power cap limit; determine a total power consumption; identify a load with a lowest priority when the determined total power consumption exceeds the determined power cap limit; turn off power supply to the load with the lowest priority when the determined total power consumption exceeds the determined power cap limit; identify a second load with a highest priority when the determined total power consumption is less than the determined power cap limit; and activate power supply to the second load with the highest priority when the determined total power consumption is less than the determined power cap limit.

(23) A system including an energy storage device and a controller configured to acquire data from one or more loads connected to the energy storage device; model the one or more loads based on the acquired data; estimate a state of charge of the ESD; determine an operational status of each of the one or more loads based on at least the state of charge of the ESD and a category of each of the one or more loads; and control each load based on the determined operational status.

(24) The system of feature (23), in which the controller is further configured to identify a parameter value as a trigger point according to the state of charge of the energy storage device for a thermostatic load, wherein the thermostatic load is switched on and off according to thermostatic parameters using the identified parameter value as the trigger point.

(25) The system of feature (24), in which the controller is further configured to determine upper and lower limits for the thermostatic parameters that are different than other upper and lower limits for the thermostatic parameters when the thermostatic load is connected to a non-dispatchable power source.

(26) The system of any of features (23) to (25), in which the controlling of the load includes: controlling a power supply to one or more switches and outlets of an electric panel.

(27) The system of feature (26), in which the electric panel includes switches and/or outlets associated with a plurality of switch and outlet categories, each category associated with a priority of the one or more loads.

(28) The system of feature (27), in which the switch and outlet categories include one or more loads of task-based loads (TBL), thermostatically run loads, and must-run loads.

(29) The system of feature (28), in which the controller is further configured to identify a TBL load having a lowest priority among the one or more loads; and reduce a run time of the TBL when the state of charge of the ESD is less than a state of charge threshold limit.

(30) The system of any of features (23) to (29), in which the controller is further configured to control a thermostatically run load for a current scheduling period when an indication of a power cap for a future scheduling period is received.

(31) The system of any of features (26) to (30), in which the controller is further configured to determine a power cap for each of the switches and/or outlets; and deactivate a switch or an outlet when power measurement from a load connected to the switch or the outlet exceeds the determined power cap.

(32) The system of any of features (26) to (31), in which the electric panel further includes a calibration smart switch and/or outlet configured to acquire power consumption of at least one load connected to the calibration switch and/or the outlet at predetermined instances.

(33) The system of any of features (12) to (21), in which the controller is further configured to determine a power cap limit; determine a total power consumption; identify a load with a lowest priority when the determined total power consumption exceeds the determined power cap limit; turn off power supply to the load with the lowest priority when the determined total power consumption exceeds the determined power cap limit; identify a second load with a highest priority when the determined total power consumption is less than the determined power cap limit; and activate power supply to the second load with the highest priority when the determined total power consumption is less than the determined power cap limit.

A non-transitory computer-readable medium storing instructions, which when executed by at least one processor cause the at least one processor to perform the method of any of features (1) to (11).

The invention claimed is:

1. A method for managing an off-grid power supply of a home energy management system, the method comprising:
    acquiring data from one or more thermostatic loads connected to the off-grid power supply;
    modeling, using processing circuitry, the one or more loads based on the acquired data and on statistics using historical data of the one or more loads;
    estimating, using the processing circuitry, a state of charge (SOC) of an energy storage device (ESD) associated with the off-grid power supply based upon forecasted power consumption of the one or more loads, wherein the state of charge is determined using $$SOC(t+1) = SOC(t) - \frac{\text{sign}(P^f(t) - P^f_{DG}(t))}{\left[a \times \left(\left|P^f(t) - P^f_{DG}(t)\right|\right)^b\right]},$$

where:
    a and b are system parameters,
    $P^f(t)$ is a sum of all forecasted load power consumptions, and
    $P^f_{DG}(t)$ is a total forecasted distributed generator generation at a time t;
    determining, using the processing circuitry, an operational status of each of the one or more loads based on at least the estimate of the state of charge of the ESD and a category of each of the one or more loads; and
    controlling each load based on the determined operational status.

2. The method of claim 1, further comprising:
    identifying a parameter value as a trigger point according to the estimate of the state of charge of the energy storage device for one of the thermostatic loads,
    wherein the one thermostatic load is switched on and off according to theimostatic parameters using the identified parameter value as the trigger point.

3. The method of claim 2, further comprising:
    determining upper and lower limits for the thermostatic parameters that are different than other upper and lower limits for the thermostatic parameters when the one thermostatic load is connected to a non-dispatchable power source.

4. The method of claim 1, wherein the controlling of the load includes:
    controlling a power supply to one or more switches and outlets of an electric panel.

5. The method of claim 4, wherein the electric panel includes switches and/or outlets associated with a plurality of switch and outlet categories, each category associated with a priority of the one or more loads.

6. The method of claim 5, wherein the switch and outlet categories include one or more loads of task-based loads (TBL), thermostatically run loads, and must-run loads.

7. The method of claim 6, further comprising:
    identifying a TBL having a lowest priority among the one or more loads; and
    reducing a run time of the TBL. when the estimate of the state of charge of the ESD is less than a state of charge threshold limit.

8. The method of claim 6, further comprising
    controlling a thermostatically run load for a current scheduling period when an indication of a power cap for a future scheduling period is received.

9. The method of claim 5, fitrther comprising:
    determining a power cap for each of the switches and/or outlets; and deactivating a switch or an outlet when power measurement from a load connected to the switch or the outlet exceeds the determined power cap.

10. The method of claim 4, wherein the electric panel further includes a calibration smart switch and/or outlet configured to acquire power consumption of at least one load connected to the calibration switch and/or the outlet at predetermined instances.

11. The method of claim 1, further comprising:
    determining a power cap limit;
    determining a total power consumption;
    identifying a load with a lowest priority when the determined total power consumption exceeds the determined power cap limit;
    turning off power supply to the load with the lowest priority when the determined total power consumption exceeds the determined power cap limit;
    identifying a second load with a highest priority when the determined total power consumption is less than the determined power cap limit; and
    activating power supply to the second load with the highest priority when the determined total power consumption is less than the determined power cap limit.

12. An energy storage device, comprising:
    a controller configured to
        acquire data from one or more loads connected to the energy storage device (ESD);

model the one or more loads based on the acquired data and on statistics using historical data of the one or more loads;

estimate a state of charge of the ESD based upon forecasted power consumption of the one or more loads, wherein the state of charge is determined using $$SOC(t+1) = SOC(t) - \frac{\text{sign}(P^f(t) - P_{DG}^f(t))}{\left[a \times \left(|P^f(t) - P_{DG}^f(t)|\right)^b\right]},$$

where:
a and b are system parameters,
$P^f$ (t) is a sum of all forecasted load power consumptions, and
$P_f^{DG}$(t) is a total forecasted distributed generator generation at a time t;
determine an operational status of each of the one or more loads based on at least the estimate of the state of charge of the ESD and a category of each of the one or more loads; and
control each load based on the determined operational status.

13. The energy storage device of claim 12, wherein the controller is further configured to:
identify a parameter value as a trigger point according to the estimate of the state of charge of the energy storage device for a thermostatic load,
wherein the thermostatic load is switched on and off according to thermostatic parameters using the identified parameter value as the trigger point.

14. The energy storage device of claim 13, wherein the controller is further configured to:
determine upper and lower limits for the thermostatic parameters that are different than other upper and lower limits for the thermostatic parameters when the thermostatic load is connected to a non-dispatchable power source.

15. A system for managing an off-grid power supply, comprising:
an energy storage device (ESD);
a controller configured to
acquire data from one or more loads connected to the ESD;
model the one or more loads based on the acquired data and on statistics using historical data of the one or more loads;
estimate a state of charge of the energy storage device based upon forecasted power consumption of the one or more loads, wherein the state of charge is determined using $$SOC(t+1) = SOC(t) - \frac{\text{sign}(P^f(t) - P_{DG}^f(t))}{\left[a \times \left(|P^f(t) - P_{DG}^f(t)|\right)^b\right]},$$

where:
a and b are system parameters,
$P^f$ (t) is a sum of all forecasted load power consumptions, and
$P_f^{DG}$(t) total forecasted distributed generator generation at a time t;
determine an operational status of each of the one or more loads based on at least the estimate of the state of charge of the ESD and a category of each of the one or more loads; and
control each load based on the determined operational status.

16. The system of claim 15, wherein the controller is further configured to:
identify a parameter value as a trigger point according to the estimate of the state of charge of the energy storage device for a thermostatic load, wherein the thermostatic load is switched on and off according to thermostatic parameters using the identified parameter value as the trigger point.

17. The system of claim 16, wherein the controller is further configured to:
determine upper and lower limits for the thermostatic parameters that are different than other upper and lower limits for the thermostatic parameters when the thermostatic load is connected to a non-dispatchable power source.

18. The system of claim 16, further comprising:
an electric panel operationally connected to the ESD, wherein the electric panel includes switches and/or outlets configured to be controlled by the controller.

19. The system of claim 18, wherein the switches and/or outlets are associated with a plurality of switch and outlet categories, each category associated with a priority of the one or more loads connected to the ESD via the electric panel.

20. The system of claim 19, wherein the switch and outlet categories include one or more loads of task-based loads (TBL), thermostatically run loads, and must-run loads.

* * * * *